United States Patent
Silver et al.

(10) Patent No.: US 11,195,215 B1
(45) Date of Patent: Dec. 7, 2021

(54) AMBIENT TRANSACTION SYSTEM

(71) Applicant: U.S. Bank National Association, Minneapolis, MN (US)

(72) Inventors: Jeremy M. Silver, Marietta, GA (US); Todd C. Moning, Victoria, MN (US); James Andrew Cantrell, Duluth, GA (US); Terron C. Hyde, Atlanta, GA (US)

(73) Assignee: U.S. BANK NATIONAL ASSOCIATION, Minneapolis, MN (US)

(*) Notice: Subject to any disclaimer, the term of this patent is extended or adjusted under 35 U.S.C. 154(b) by 0 days.

(21) Appl. No.: 17/115,070

(22) Filed: Dec. 8, 2020

(51) Int. Cl.
   *G06Q 30/00* (2012.01)
   *G06Q 30/04* (2012.01)
   (Continued)

(52) U.S. Cl.
   CPC .......... *G06Q 30/04* (2013.01); *G06N 20/00* (2019.01); *G06Q 20/027* (2013.01);
   (Continued)

(58) Field of Classification Search
   None
   See application file for complete search history.

(56) References Cited

U.S. PATENT DOCUMENTS

| | | | |
|---|---|---|---|
| 8,498,900 B1 * | 7/2013 | Spirin | G06Q 20/14 705/15 |
| 8,527,413 B2 * | 9/2013 | Heller | G06Q 20/102 705/40 |

(Continued)

FOREIGN PATENT DOCUMENTS

| | | | | |
|---|---|---|---|---|
| JP | 2018191301 A | * | 11/2018 | |
| JP | 2019012402 A | * | 1/2019 | ............. G06F 13/00 |
| JP | 2019105928 A | * | 6/2019 | |
| WO | WO-2009137633 A1 | * | 11/2009 | ......... G07F 17/3209 |

OTHER PUBLICATIONS

Maxat Pernebayev et al. Design, Implementation, and Evaluation of a Menu Management System for Restaurants. (Jul. 1, 2013). Retrieved online Feb. 3, 2021. https://files.ifi.uzh.ch/CSG/staff/tsiaras/Extern/Theses/MP_Maxat_Pernebayev_Tanvi_Singh_Karthick_Sundararajan.pdf (Year: 2013).*

(Continued)

*Primary Examiner* — James A Reagan
(74) *Attorney, Agent, or Firm* — Merchant & Gould P.C.

(57) ABSTRACT

An ambient transaction system is described for facilitating various transactions types between a management system and a connected device over a transaction platform. Based on a variety of different triggering conditions, the transaction platform may establish an integrated session among the transaction platform, the management system, and the connected device. The transaction platform includes integrated logic of the management system such that a presentment layer provided to the connected device by the transaction platform via the integrated session includes features of the management system associated with the transaction type. When the transaction is a payment transaction, the features may include a payment feature through which checkout options may be selected for payment via the connected device. Upon receiving a payment selection from the connected device, the transaction platform may transmit the payment information to a payment processing system, and provide payment confirmation to at least the management system.

20 Claims, 16 Drawing Sheets

(51) Int. Cl.
*G06Q 20/32* (2012.01)
*G06Q 20/22* (2012.01)
*G06Q 20/02* (2012.01)
*G06Q 20/12* (2012.01)
*G06Q 30/02* (2012.01)
*G06Q 30/06* (2012.01)
*G06Q 20/40* (2012.01)
*G06N 20/00* (2019.01)
*H04L 29/08* (2006.01)
*G06K 19/07* (2006.01)
*G06K 7/14* (2006.01)
*G06K 7/10* (2006.01)
*G06K 19/06* (2006.01)

(52) U.S. Cl.
CPC ......... *G06Q 20/123* (2013.01); *G06Q 20/127* (2013.01); *G06Q 20/227* (2013.01); *G06Q 20/3255* (2013.01); *G06Q 20/3272* (2013.01); *G06Q 20/3276* (2013.01); *G06Q 20/4015* (2020.05); *G06Q 20/40145* (2013.01); *G06Q 30/0222* (2013.01); *G06Q 30/0226* (2013.01); *G06Q 30/0234* (2013.01); *G06Q 30/0279* (2013.01); *G06Q 30/0613* (2013.01); *G06Q 30/0633* (2013.01); *H04L 67/141* (2013.01); *H04L 67/143* (2013.01); *G06K 7/10297* (2013.01); *G06K 7/1413* (2013.01); *G06K 7/1417* (2013.01); *G06K 19/06028* (2013.01); *G06K 19/06037* (2013.01); *G06K 19/0723* (2013.01); *G06Q 20/3278* (2013.01)

(56) References Cited

U.S. PATENT DOCUMENTS

| | | | |
|---|---|---|---|
| 8,738,024 B1* | 5/2014 | Kerr | G06Q 30/0233 |
| | | | 455/456.5 |
| 9,208,482 B2* | 12/2015 | Laracey | G06Q 20/20 |
| 9,811,813 B2* | 11/2017 | Laracey | G06Q 20/322 |
| 10,140,820 B1* | 11/2018 | Zalewski | G07G 1/0072 |
| 11,010,488 B2* | 5/2021 | Roden | G06N 20/10 |
| 2013/0218721 A1* | 8/2013 | Borhan | G06Q 30/02 |
| | | | 705/26.41 |
| 2014/0114776 A1* | 4/2014 | Solanki | H04W 4/02 |
| | | | 705/15 |
| 2015/0170183 A1* | 6/2015 | Santaella | G06Q 30/0226 |
| | | | 705/14.27 |
| 2016/0092864 A1* | 3/2016 | Evans | G06Q 30/04 |
| | | | 705/40 |
| 2016/0162478 A1* | 6/2016 | Blassin | G06Q 10/06311 |
| | | | 706/12 |
| 2020/0111319 A1* | 4/2020 | Palmisano | G06Q 20/405 |
| 2020/0272790 A1* | 8/2020 | Chen | G06F 16/24522 |
| 2020/0302740 A1* | 9/2020 | Cleveland | G07F 17/3225 |
| 2020/0302746 A1* | 9/2020 | Cleveland | G06Q 20/3278 |
| 2020/0348662 A1* | 11/2020 | Cella | G05B 23/0229 |
| 2021/0133670 A1* | 5/2021 | Cella | G06N 5/04 |

OTHER PUBLICATIONS

• Jan Meier. Design, Implementation, and Evaluation of an Object Tracking Motion Detection System. (May 31, 2017). Retrieved online Sep. 4, 2021. https://files.ifi.uzh.ch/CSG/staff/schmitt/Extern/Theses/Jan_Meier_MA.pdf (Year: 2017).*

* cited by examiner

AMBIENT TRANSACTION SYSTEM

BACKGROUND

Specialized systems including a combination of hardware and software components are often needed to facilitate the transactions. For example, payment transactions in physical point of sale (POS) environments typically include POS equipment used to ring up purchases and accept payments via cash, check, or payment instruments (e.g., credit or debit cards, mobile payment devices, and the like). This requires expensive implementation and integration of POS environments, hardware at each POS location (e.g., registers, terminals, pin pads, and the like), and software, all of which requires tedious, expensive, and time consuming certification. Additionally, to maintain operations and security, there is expense and effort required by Payment Card Industry (PCI) and network regulations. If not utilizing cash or check, it also requires consumers to carry and payment instruments for payment, and if using a mobile device, typically to download and activate a phone application. This method of payment can leave consumers vulnerable to fraudulent activity, and provides merchants at least temporary access to or knowledge of the payment instruments being used. Moreover, the transaction is often disjointed as it is limited to a very end of a consumer interaction.

Accordingly, it is with respect to these and other general considerations that embodiments have been described.

SUMMARY

In general terms, this disclosure is directed to an ambient transaction system comprising a transaction platform that facilitates a transaction of a structured data object, such as a payment, between at least two clients, such as a device executing a management system and a connected device. Various aspects are described in this disclosure, which include, but are not limited to, the following aspects.

In one aspect, an example method is described where a request is received from a management system associated with a first party to a transaction to establish a first session with the management system. The first session with the management system may be established, and an integrated session may be established with the management system and a connected device of a second party to the transaction. A presentment layer associated with the transaction may be provided to the connected device via the integrated session. The presentment layer may include a plurality of features of the management system associated with the transaction. Upon completion of the transaction, one or more of the first session and the integrated session may be closed.

In another aspect, an example method is described where a request to establish a first session with a transaction platform is transmitted to the transaction platform. Upon the establishing of the first session with the transaction platform and an integrated session with the transaction platform and a connected device, a transaction with the connected device may be caused to be recorded within the integrated session. A plurality of features associated with the transaction and corresponding data to populate the plurality of features for provision within a presentment layer to the connected device via the integrated session may be transmitted to the transaction platform. The recording of the transaction may be ended upon completion of the transaction.

In a further aspect, an example method is described where a connected device receives, from a transaction platform via an integrated session established among the transaction platform, a management system, and the connected device, a link to a presentment layer associated with a transaction with the management system. The presentment layer may include a plurality of features of the management system associated with the transaction. The presentment layer may be displayed through a user interface, and a message associated with the transaction may be transmitted to the transaction platform.

BRIEF DESCRIPTION OF THE DRAWINGS

Non-limiting and non-exhaustive examples are described with reference to the following figures.

DETAILED DESCRIPTION

Figure 1:
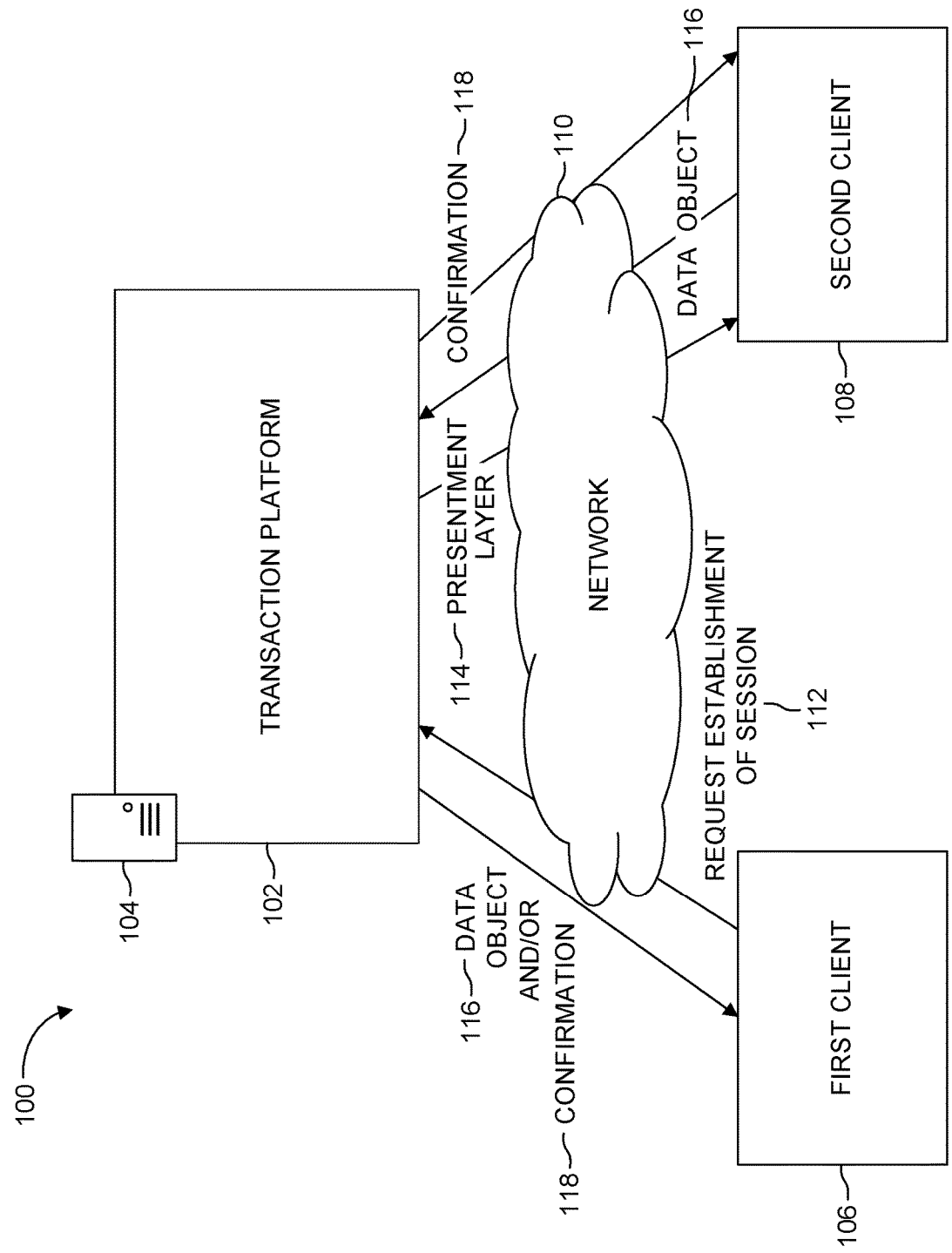
FIG. 1 illustrates an example network environment where an ambient transaction system may be implemented to facilitate a transaction of a structured data object.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Aspects of the present invention are directed to an ambient transaction system comprised of a device-to-device transaction platform that establishes an integrated session among the transaction platform and the devices to facilitate a transaction. For example, for a payment-related transaction, the integrated session may be established among the transaction platform, a device executing a management system of a payee of the transaction, and a connected device of a payor of the transaction. The connected device may be any Internet of things (IOT) connected device that is capable of opening and executing a link generated by the transaction platform using logic of the management system to, among other things, review an invoice associated with the transaction and select payment for the transaction via a presentment layer processed by and/or displayed on the connected device. In some examples, the connected device is a portable or mobile device that is easily movable by a user (e.g., may be carried on the user). Thus, the ambient transaction system empowers the payor to have a transparent transaction experience and pay securely on their own connected device.

Through the integrated session, the transaction platform brings secure digital transaction integration using a variety of application programming interfaces (APIs) and presentment technologies for any environment (e.g., physical, remote, or virtual), any entity, any platform, and any device without requiring a point-of-sale (POS) infrastructure. As a result, traditional payment instruments, terminals (e.g., card readers), or pin pads, as well as certification, and PCI scope are no longer necessary for entities to maintain, and a variety of payment options beyond the traditional payment instruments are provided to the payor.

Additionally, payment security is enhanced by removing the requirement of presenting a card (whether physically or by using proximity based wireless or Europay, MasterCard, Visa (EMV)/near field communications (NFC) dongle technologies). In fact, by utilizing the transaction platform, the payee does not receive any of the payment information associated with the payor beyond a confirmation that the payment was authorized. Similarly, the payor does not receive information associated with the payee.

While a custom application (e.g., a custom payment application) can optionally be utilized to facilitate transactions, aspects of the embodiments described herein do not require such a custom payment application on the connected device (including cards or mobile devices loaded with card information) to facilitate the payment. Thus, aspects of the ambient transaction system can be implemented on the connected device using existing software installed thereon. Moreover, the transaction experience is immediately initiated (e.g., via the presentment layer), and thus present throughout a part of or an entirety of the transaction or a transaction-based relationship.

FIG. 1 illustrates an example network environment where an ambient transaction system 100 may be implemented to facilitate a transaction of a structured data object. The ambient transaction system 100 may include at least a transaction platform 102 hosted by and executing on a server 104, and a first client 106 and a second client 108 capable of communicating with the server 104 over a network 110. The ambient transaction system 100 may be compatible with traditional transaction systems, and may be used in addition to or in place of the traditional transaction systems. For simplicity, ambient transaction system 100 is described as having two clients involved as a first party and a second party to a transaction, first client 106 and second client 108. In other examples, there may be a plurality of clients (e.g., up to n clients) associated with each party to the transaction.

The first client 106 and the second client 108 may include one or more of a desktop computer, a laptop computer, a tablet computer, a smart phone, a smart television, a smart camera, a voice-enabled device, a wearable computing device, or any other type of IoT connected device. Additionally, one or more of the first client 106 and second client 108 may be an implementation of a virtual machine or software rendered device. In some examples, and as described in greater detail below with reference to FIG. 2, the first client 106 may be executing an application associated with a management system, a point-of-sale (POS) system, or other similar system, where logic of the application is integrated into the transaction platform 102. Additionally, the first client 106 and/or the second client 108 may further be any type of IOT connected device capable of opening and executing a link.

The transaction platform 102 may establish an integrated session among the transaction platform 102, the first client 106, and the second client 108 in response to various conditions that indicate an occurrence of a transaction between the first client 106 and the second client 108, where the transaction may be a one-time transaction, an ongoing transaction, or a recurring transaction. As part of the establishment of the integrated session, the transaction platform 102 may generate and provide a presentment layer 114 to the second client 108. In some examples, the presentment layer 114 may be provided by use of a link. The link is one or more of an instruction or an address that passes control and parameters, including parameters (e.g., features and/or other data) associated with the management system of the first client 106, between the transaction platform 102 and the second client 108. A variety of different types or formats of links may be provided. For examples, the link may include, but is not limited to, a hyperlink, a machine readable code, a machine readable sound, image or bitmap, a NFC, Wi-Fi®, Bluetooth® Low Energy (BLE) or other wireless communication, a virtual assistant, voice request, or natural language phrase, a biometric recognition, a geolocation detection, a virtual game object, an action code, or other executable code.

In some examples, the transaction platform 102 may establish the integrated session concurrently with a first session established with the first client 106 in response to receipt of a request 112 from the first client 106 over the network 110 (e.g., if the request 112 includes an identifier of the second client 108 enabling the link to be sent to the second client 108 from the transaction platform 102). In other examples, the transaction platform 102 may use other methods (e.g., smart camera recognition) to detect and/or identify the second client 108 for establishment of the integrated session. As one non-limiting example, if the first client 106 and the second client are NFC enabled, the transaction platform 102 can provide the link to the first client 106 to be communicated to the second client 108 using NFC. Similar transfer of the link may occur using BLE communications. As another non-limiting example, the transaction platform 102 may generate and provide to the first client 106 a machine-readable code comprising the link that is readable by second client 108. As a further non-limiting example, the first client 106 may be associated with one or more beacons, a geofence, or other similar sensing technologies that can detect the second client 108, including identifiable information thereof, for provision to the transaction platform 102.

Once the integration session is established, the transaction platform 102 provides a presentment layer 114 to the second client 108 for display over the network 110. The presentment layer 114 includes features that enable a user, via the second client 108, to interact with the integrated session (e.g., features from the application executed by first client 106 and integrated with transaction platform 102 to allow for data brokering). The features include at least options to facilitate a transaction between the first client 106 and the second client 108. For example, the transaction may be a transfer of a structured data object 116. Example types of the structured data object 116 may include monetary payments, non-monetary payments, data, contracts, identity attributes, and tokenized assets, among other examples. In some examples, the presentment layer 114 may also integrate accessibility features of the second client 108. In some examples, the presentment layer 114 may also integrate security features with the first and second clients 106, 108.

Utilizing one or more of the features of the presentment layer 114, the structured data object 116 or at least information associated with the structured data object 116 may be transmitted from the first client 106 to the transaction platform 102. The transaction platform 102 may then transmit the structured data object 116 to the first client 106 and provide a confirmation 118 to the first client 106 and/or the second client 108 that the transaction was complete. Alternatively, and as described in greater detail with reference to FIG. 2, if the structured data object 116 is a payment related data object, the transaction platform 102 may be communicatively coupled to a payment gateway that provides information associated with the payment related data object to a payment processor to authorize and confirm payment. Confirmation may be returned to the transaction platform 102 from the payment processor via the payment gateway. The transaction platform 102 may then provide the confirmation 118 that the transaction is complete to one or more of the first client 106 and the second client 108.

In some examples, the transaction platform 102 may implement machine-learning techniques to learn transaction patterns between the first client 106 and the second client 108 over the transaction platform 102, and enable prediction and automatic execution of future transactions between the first client 106 and the second client 108 based on the learned patterns. As described in more detail with reference to FIG. 5, the machine-learning techniques may be implemented at the database layer of the transaction platform 102, and may include unsupervised clustering of transaction activity, merchant data, and merchant activity, as well as supervised regression analysis. The machine-learning techniques implemented may enable prediction of best-cost processing for the first client 106 and/or the second client 108, fraud, or best price or best timing to complete the transaction if the transaction is not a real time transaction. Additionally, a number of opportunities to analyze and create actions or new models or algorithms may be made available by the data collected and techniques applied. Further, the machine-learning techniques can be used to optimize features to meet the needs of participants of the transaction platform 102 (e.g., first client 106 and/or the second client 108) by anticipating volumes and supporting dynamic loyalty offers on behalf of the participants, as well as other services, in an informed manner.

As illustrated in FIG. 1, the ambient transaction system 100 has a cloud-based server-client architecture. In other examples, alternative architectures for the ambient transaction system 100 may be implemented. In a first example, the ambient transaction system 100 may have an edge computing architecture (e.g., Multi-access Edge Computing (MEC)), where the transaction platform 102 is hosted and run on a public or a private cloud and interacts with edge devices (e.g., the first client 106 and second client 108) to facilitate the transaction through one or more edge clouds to which the edge devices are communicatively coupled to via one or more access points. In a second example, the ambient transaction system 100 may have a wireless mesh architecture (e.g., implement mesh networking technology), where nodes of the mesh network efficiently route data objects from the server 104 hosting the transaction platform 102 (e.g., a central server) to the first client 106 and the second client 108. As a third example, the ambient transaction system 100 may implement BLE architecture, where a device executing the transaction platform 102, the first client 106, and the second client 108 each have BLE architecture to enable communications among the devices. As a fourth example, the transaction platform 102 of the ambient transaction system 100 may be a system-on-a-chip solution for embedding into devices. As a fifth example, the transaction platform 102 of the ambient transaction system 100 may be provided as a distributed application using smart contracts on distributed ledgers and blockchains. These examples provided herein are non-limiting and non-exhaustive examples.

The example embodiments of the invention presented herein are directed to an ambient transaction system comprised of a device-to-device transaction platform that establishes an integrated session among the transaction platform and the devices to facilitate a transaction, In the following figures and description, the transaction is described in terms of an example payment transaction [e.g., a payment between two parties using the device-to-device transaction platform]. This description is not intended to limit the application of the example embodiments presented herein. In fact, after reading the following description, it will be apparent to one skilled in the relevant art(s) how to implement the following example embodiments in alternative embodiments [e.g., involving any type of transaction, including non-payment transactions, between any number of parties and thus any number of devices connected to the transaction platform].

Figure 2:
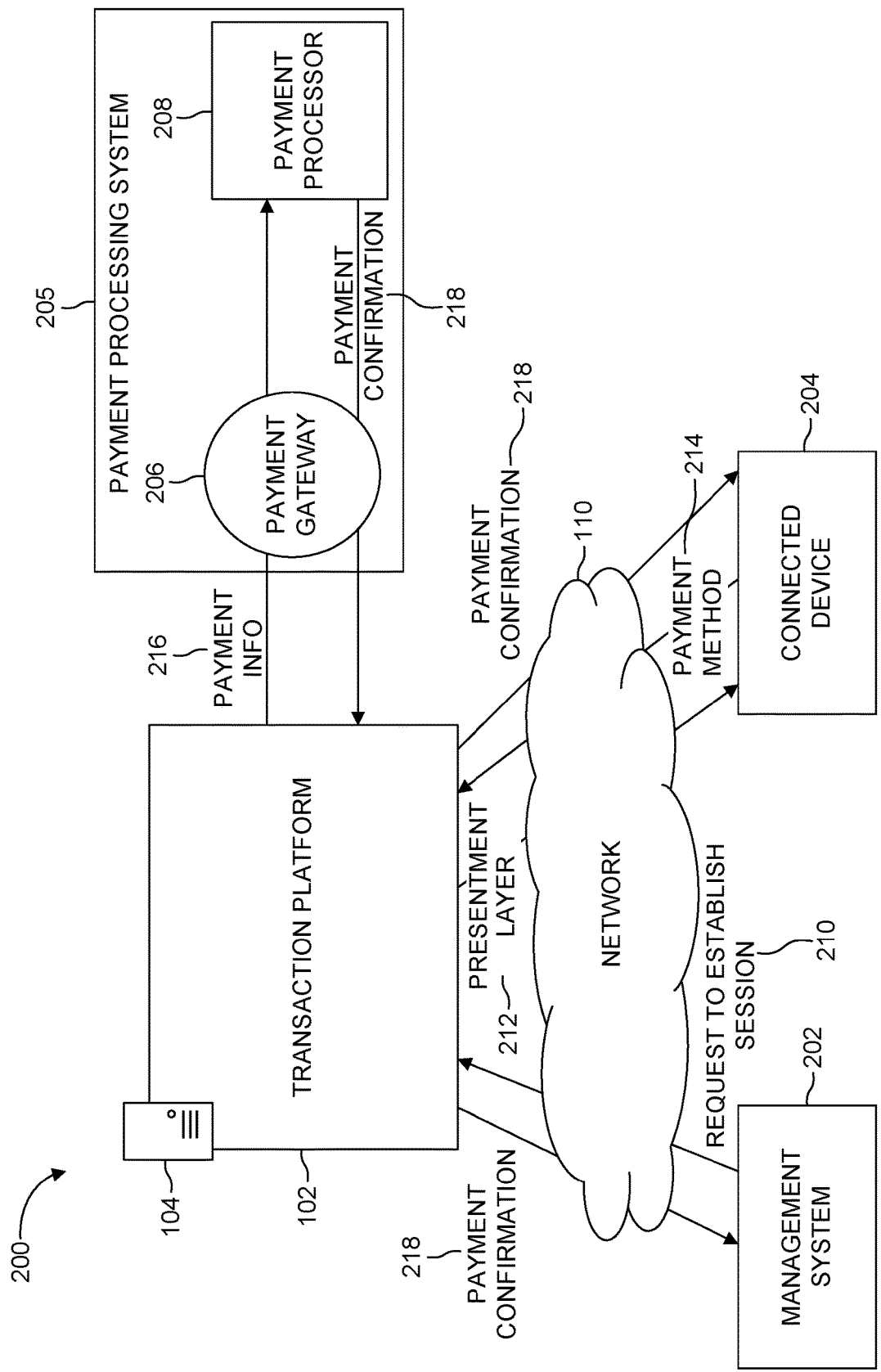
FIG. 2 illustrates an example network environment where the ambient transaction system may be implemented to facilitate a payment transaction.

FIG. 2 illustrates another example network environment where an ambient transaction system 200 to facilitate a payment transaction may be implemented. Similar to the ambient transaction system 100 described with reference to FIG. 1, the ambient transaction system 200 includes the transaction platform 102 hosted on and executed by the server 104 that interacts with at least two clients over the network 110. In the ambient transaction system 200, the clients include a management system 202 and a connected device 204. Additionally, the ambient transaction system 200 is communicatively coupled to a payment processing system 205 comprising a payment gateway 206 and a payment processor 208. The ambient transaction system 200 may be compatible with traditional payment transaction systems, and may be used in addition to or in place of the traditional payment transaction systems.

In some examples, the management system 202 may be associated with a payee of the payment transaction and include at least a point of sale (POS) system integrated therein. The management system 202 can also include additional sub-systems or modules, such as a workflow module, described in greater detail with reference to FIG. 5. In other examples, the POS system can be a separate system from the management system 202 that is communicatively coupled to the management system 202. The transaction platform 102 may communicate with both the management system 202 and the POS system over the network 110 and/or the management system 202 may act as an intermediary relaying communications from the transaction platform 102 to the POS system or from the POS system to the transaction platform. However, for clarity, the management system 202 referred to hereafter has an integrated POS system. In some examples, the management system 202 may be provided as an application that is executed on a computing device. For example, a thin version of the application (e.g., a web browser) or a thick version of the application (e.g., a locally installed application) may be executed on the computing device. As described in detail with reference to FIG. 7, the device on which the management system 202 is executing may include a display through which a graphical user interface can be provided or at least a voice interface to enable user interactions with the device.

In some examples, the connected device 204 may be associated with a payor of the payment transaction. Specifically, the connected device 204 may be a device of the payor (e.g., the payor's own device). The connected device 204 may be any IOT connected device that is capable of opening and executing a link. As described in detail with reference to FIG. 7, the connected device 204 may include a display through which a graphical user interface and/or at least include a voice interface to enable user interactions with the connected device 204.

The transaction is illustrated as a one to one transaction between the management system 202 and the connected device 204. However, in other examples, the transaction can also be performed one to many or many to one. For example, there may be multiple payors transacting with the payee (and thus multiple connected devices of the respective multiple payors transacting with one connected device) over the transaction platform 102. Alternatively, there may be one payor transacting with multiple payees (and thus one connected device transacting with multiple management systems associated with the respective multiple payees) over the transaction platform 102.

In this example, the transaction may be a payment transaction, whereby the payor associated with the connected device is actively transacting with the payee whom the management system 202 is associated with. As one example, the payor may be a customer who is purchasing goods or services from a merchant who is the payee. Note that although the terms payee and payor are being utilized to describe parties of the transaction and this specific example transaction is a payment transaction, the transaction may not necessarily involve a payment of monetary or non-monetary value in exchange for a good or service. As one example, the transaction may be associated with a pre-order of a good or service, where payment is not due until the time of delivery or performance. As another example, the transaction may be associated with a return of a previously purchased good, where a monetary refund or credit is involved rather than a payment. As a further example, the transaction may be associated with a donation. Additionally, even in a scenario where the transaction would typically involve a payment of monetary or non-monetary value in exchange for a good or service, the transaction may be initiated but then terminated pre-mature to completion.

The management system 202 may transmit a request 210 to establish a first session to the transaction platform 102 over the network 110, the request indicating a payor is actively transacting with the management system 202 and a type of the transaction. The transaction may be a one-time transaction (e.g., a single ring up and payment for food items to go from a restaurant) or the transaction may be an ongoing transaction (e.g., a sit-down dining experience at the restaurant where food items are progressively ordered and added to the bill). In further examples, the transaction may be a recurring transaction (e.g., a payment for yardwork services performed monthly). In yet further examples, the transaction may be a transaction relationship where transacting with at least one payee may enable further transactions with one or more other payees for an defined or open-ended period of time. The transaction platform 102 may establish the first session between the management system 202 and the transaction platform 102, and an integrated session among the transaction platform 102, the management system 202, and the connected device 204 of the payor. The established integrated session may be authenticated to create a unique, tokenized session, as described in greater detail with reference to FIGS. 5 and 6, which allows secure communications and transfer of data among the transaction platform 102, the management system 202, and the connected device 204. As part of the establishment of the integrated session, the transaction platform 102 may provide a presentment layer 212 to the connected device 204 over the network 110. The transaction platform 102 may utilize a variety of presentment connectivity technologies that trigger provision of the presentment layer 212 to the connected device 204 for display thereon, including but not limited to, links (e.g., barcodes, QR codes, electronic mail, text message, NFC taps, BLE or other wireless communications, voice assistance requests or natural language phrases, a geolocation detection (in physical or virtual space), virtual game objects or action codes), sensors, radio waves (e.g., beacons, geofence, etc.), camera detection, sound detection (e.g., speakers, voice, ultra, and subsonic), biometrics. The presentment layer 212 may be displayed on the connected device 204 using existing software of the connected device, such as mobile web applications (e.g., via a web browser), native mobile applications, distributed applications, firmware, a virtual machine implementation, chatbots, or game software code, among other similar examples.

In some examples, the first session and the integrated session may be established concurrently. For example, the request 210 may also include an identifier of the connected device 204 associated with the payor to enable concurrent establishment of the integrated session. One example identifier is a mobile number associated with the connected device 204, where the mobile number may be manually provided as input to the management system 202. Another example identifier may be gathered by the management system 202 automatically based on presence detection of the connected device 204 by the management system 202. One or more of the following technologies may be implemented to enable the presence detection: NFC, BLE, infrared (IR) sensors, sound detection devices, lidar technology, and geolocation detection (or detection of the absence of a geolocation coordinate having been there previously), among other similar technologies. A link to the presentment layer 212 may be provided through a messaging client of the connected device 204 (e.g., as a text message, electronic email message, or an application message) that may automatically cause display of the presentment layer 212 upon receipt or may cause display of the presentment layer 212 upon selection of the link.

In other examples, the integrated session may be established subsequent to the first session. For example, upon establishment of the first session between the transaction platform 102 and the management system 202, the transaction platform 102 may generate the presentment layer 212. In one embodiment, the transaction platform 102 may then generate, as the link to access the presentment layer 212, a machine readable code (e.g., a barcode or a QR code) or image or watermark or other visual or audible machine recognition pattern, and provide the machine readable code to the management system 202 for display such that the connected device 204 can scan or otherwise read the machine readable code to cause automatic display of the presentment layer 212 on the connected device 204. The integrated session may be established among the transaction platform 102, the management system 202, and the connected device 204 upon the scanning of the machine readable code by the connected device 204. In another embodiment, the transaction platform 102 may generate, as the link to access the presentment layer 212, a wireless communication, such as a NFC or BLE communication, for example, that the transaction platform 102 provides to the management system 202 for ultimate transmission from a device that the management system 202 is executing on to the connected device 204 within an NFC or BLE communication, for example. Receipt of the link via the wireless communication at the connected device 204 may cause automatic display of the presentment layer on the connected device 204. The integrated session may be established among the transaction platform 102, the management system 202, and the connected device 204 upon receipt of the link by the connected device 204.

The presentment layer 212 may be associated with the transaction, and may include features of the management system 202 that can be interacted with using the connected device 204. The features may be based on the type of transaction (e.g., one-time, ongoing, recurring, sale, return, donation, discount, level-up etc.). The presentment layer 212 and/or the features of the presentment layer 212 may be pushed to the connected device 204 by the transaction platform 102 or may be pulled by the connected device 204 from the transaction platform 102. The presentment layer 212 may also integrate accessibility features of the connected device 204. For example, as described in greater detail with reference to FIG. 16, if the payor is visually impaired, accessibility features, such as larger font, that are applied by applications of the connected device 204 may be similarly applied within the presentment layer 212. Other accessibility features may be integrated to assist a payor that is of a different language or is hearing impaired.

In some examples, the features include at least an invoice and payment features. For example, the invoice feature may show a tab, check, or bill recorded by the management system 202. If the transaction is an on-going transaction, the invoice may be continuously updated as items or services are added or removed at the management system 202. For example, any time a change to the current state of the invoice occurs, the updated invoice can be pushed from the management system 202 to the transaction platform 102 and from the transaction platform 102 to the connected device 204. In other examples, only the final invoice may be provided during a checkout process, for example. In yet another example, the invoice may never be provided, rather the checkout process is fully automatic via a setting or parameter and the payor can access the receipt, statement or other data after the fact (e.g., for maximum convenience or to prevent non-payment such as gas drive-offs or dine & dashes.)

The payment features may include a plurality of payment method options that the payor may utilize to pay for the invoice via the connected device 204. Payment method options may include, but are not limited to, cards, real-time payments, digital wallets, virtual cards and virtual accounts whether ephemeral or one-time use or recurring use, loyalty currency, gaming currency, cryptocurrency, and digital tokens, among other similar payment methods. The payment method options can also include options to split the invoice with one or more other payors or a add tip. Additionally, ratings or a comment or a survey associated with service can be provided along with the payment method options. In some examples, the connected device 204 may have predefined settings that automatically select and apply a particular payment method, including whether and an amount to tip, among the options (where the amount automatically applied for tip can be adjusted after the fact). The payment method options can be presented in response to selection on the connected device 204 to checkout or pay, for example. In other examples, the payment method options can be presented in response to an indication from the management system 202 to the transaction platform 102 to facilitate completion of the transaction. In further examples, the payment method options can be presented automatically based on a detected location of the connected device 204 (e.g., in response to the connected device 204 leaving premises of the merchant).

Other features associated with the management system 202 can also be included in the presentment layer to allow varying levels of interactivity with or negotiation of the transaction. As one example, if the management system 202 is associated with a restaurant, in addition to the invoice and payment features, other features can include a feature to view a menu, order additional items from a menu, or request assistance from a server, among other similar examples. Based on the establishment and authentication of the integrated session, the connected device 204, in some examples, may interact directly with the management system 202 when utilizing these other features. For example, if another item is ordered through the presentment layer feature displayed on the connected device 204, the order may be directly communicated to the management system 202 rather than first be pushed to the transaction platform 102 to then be pushed to the management system 202. Another example feature may include the negotiation of discounts based on time, place, date, or number ordered.

Additionally, preferences of the payor associated with the connected device 204, as well as other parameters or capabilities, including extensions thereof, related to one or more features provided within the presentment layer 212 may be saved. Therefore in a future transaction between the connected device 204 and the management system 202 (or another management system related to or part of a same network of management systems as the management system 202) over the transaction platform 102, the preferences, parameters, and/or capabilities may be applied within the presentment layer 212.

When a payment method 214 is selected, information associated with the selected payment method 214 may be pushed from the connected device 204 to the transaction platform 102. In other examples, the information associated with the selected payment method 214 may be obtained from another data store which holds the payment method details. The transaction platform 102 may then provide payment information 216, including at least the information associated with the selected payment method 214 and an amount of the invoice to the payment gateway 206. The payment gateway 206 may facilitate the transaction by transferring the payment information 216 between the transaction platform 102 and the payment processor 208. In some examples, the payment gateway 206 may be associated with a same service that is hosting the transaction platform 102 on the server 104. In other examples, the payment gateway 206 may be provided by a third party service. The payment processor 208 may then verify transaction details, ensure funds are available, and perform anti-fraud measures to authorize the transaction. If the transaction is authorized, the payment processor may transmit a payment confirmation 218 via the payment gateway 206 to the transaction platform 102.

The transaction platform 102 may then transmit the payment confirmation 218 to at least the management system 202 to indicate the payment was authorized and the payment transaction is completed. The transaction platform 102 may also transmit the payment confirmation 218 to the connected device 204. In some examples, the payment confirmation 218 may be a pop-up notification or message via the presentment layer 212 or an alternative communication platform on the connected device (e.g., an e-mail client or a text messaging client, among other similar messaging clients). In other examples, the payment confirmation 218 may be in a form of a receipt or a transaction history or statement available through a display.

As illustrated in FIG. 2, the ambient transaction system 200 has a cloud-based server-client architecture. In other examples, alternative architectures for the ambient transaction system 200 may be implemented. In a first example, the ambient transaction system 200 may have an edge computing architecture (e.g., Multi-access Edge Computing (MEC)), where the transaction platform 102 is hosted and run on a public or a private cloud and interacts with edge devices (e.g., the first client 106 and second client 108) to facilitate the transaction through one or more edge clouds to which the edge devices are communicatively coupled to via one or more access points. In a second example, the ambient transaction system 200 may have a wireless mesh architecture (e.g., implement mesh networking technology), where nodes of the mesh network efficiently route data objects from the server 104 hosting the transaction platform 102 (e.g., a central server) to the management system 202 and the connected device 204. As a third example, the ambient transaction system 200 may implement BLE architecture, where a device executing the transaction platform 102, the management system 202, and the connected device 204 each have BLE architecture to enable communications among the devices. As a fourth example, the transaction platform 102 of the ambient transaction system 200 may be a system-on-a-chip solution for embedding into devices. As a fifth example, the transaction platform 102 of the ambient transaction system 200 may be provided as a distributed application using smart contracts on distributed ledgers and blockchains. These examples provided herein are non-limiting and non-exhaustive examples.

Figure 3:
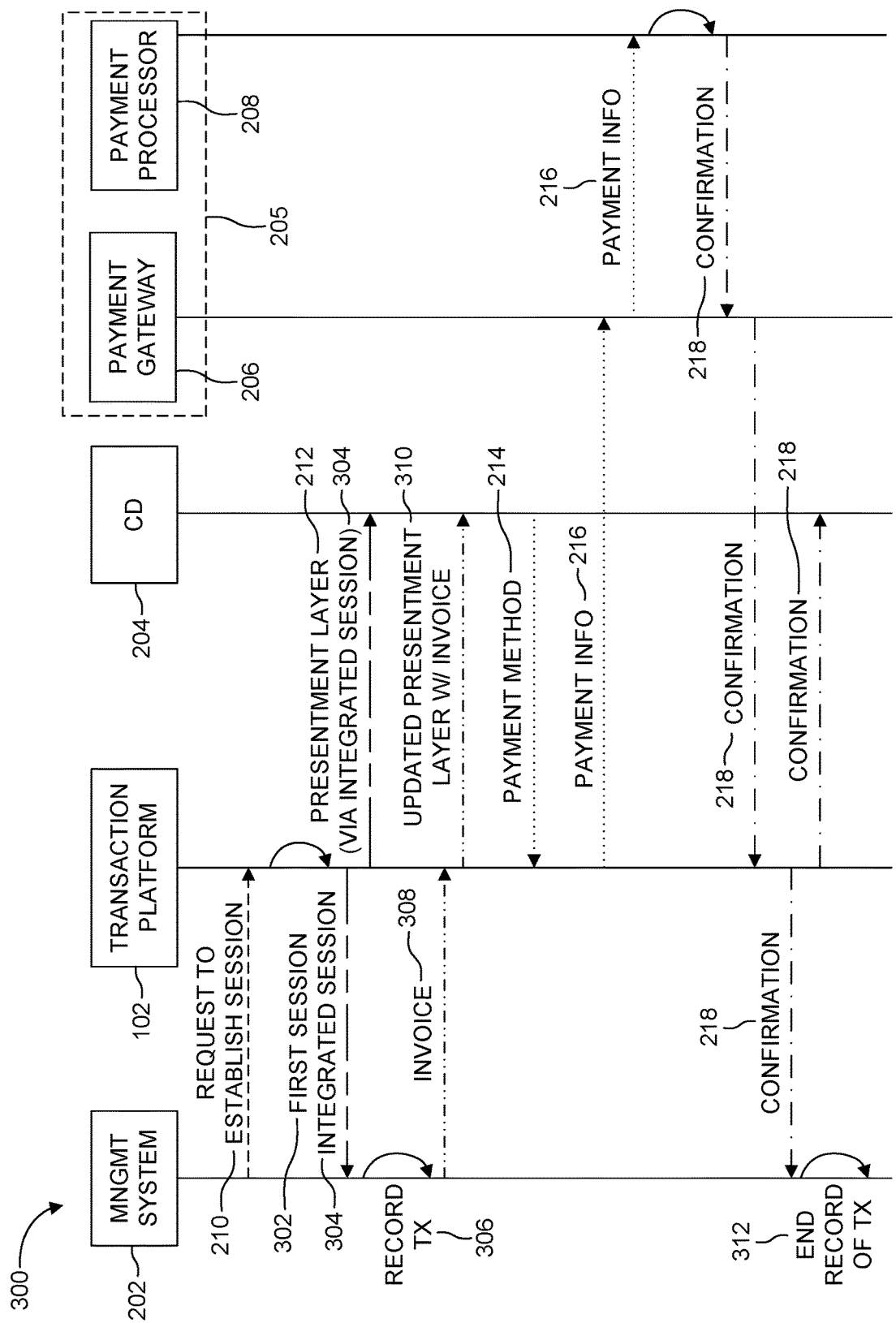
FIG. 3 is a communication diagram illustrating interactions between components of the example ambient transaction system described in FIG. 2.

FIG. 3 is a communication diagram 300 illustrating interactions between components of the example ambient transaction system 200 described in FIG. 2. The components of the ambient transaction system 200 include the transaction platform 102, the management system 202 and the connected device 204 communicatively coupled to the transaction platform 102 over a network, and the payment processing system 205 communicatively coupled to the transaction platform 102 over a same or different network that includes the payment gateway 206 and the payment processor 208.

The management system 202 transmits the request 210 to establish a first session 302 with the transaction platform 102. The request indicates that there is a transaction occurring between the management system 202 and another device, such as the connected device 204. The transaction platform 102 establishes at least the first session 302 between the transaction platform 102 and the management system 202. The first session 302 may establish communication and data transfer between the transaction platform 102 and one or more sub-components of the management system 202 as described in greater detail with reference to FIGS. 4 and 5. In some examples and as illustrated herein, the transaction platform 102 may concurrently establish an integrated session 304 among the transaction platform 102, the management system 202, and the connected device 204 (e.g., if the request 210 includes an identifier of the connected device 2204). In other examples, the integrated session 304 may be established subsequent to the first session 302 after the connected device 204 has otherwise been detected or identified, as described in detail with reference to FIG. 2.

Once the integrated session 304 is established, the management system 202 begins recording the transaction 306 between the management system 202 and the connected device 204 within the integrated session 304. Additionally, the transaction platform 102 generates and provides the presentment layer 212 to the connected device 204 through the integrated session 304. The presentment layer 212 includes features that enable a user of the connected device 204 to interact with or negotiate the transaction via the connected device 204, including at least features to view an invoice and pay the invoice associated with the transaction. In some examples, as an invoice 308 is created and/or updated by the management system 202, the invoice 308 may be pushed to or pulled by the transaction platform 102. The transaction platform 102 may then update the presentment layer 212 with the invoice 308 in its current state to create an updated presentment layer 310, and the updated presentment layer 310 is pushed to or pulled by the connected device 204.

The connected device 204 may be capable of utilizing features of the presentment layer 212 and the updated presentment layer 310 to send messages to the transaction platform 102 related to a variety of transaction aspects. As one example, a payment method 214 may be selected from one or more payment method options presented via the pay invoice feature of the updated presentment layer 310 via the connected device 204, and the payment method 214 may be pushed to the transaction platform 102 as a message.

The transaction platform 102 may provide the payment information 216 to the payment processor 208 via the payment gateway 206, where the payment information 216 includes information associated with the payment method 214 and an amount of the invoice. The payment processor 208 may then verify the payment method, ensure funds are available to cover the invoice amount, and perform anti-fraud measures to authorize the transaction. If the transaction is authorized, the payment processor 208 may transmit the payment confirmation 218 via the payment gateway 206 to the transaction platform 102. The transaction platform 102 may then transmit the payment confirmation 218 to at least the management system 202 to indicate the payment was authorized and the payment transaction is completed. The management system 202 may end the recording of the transaction 312 between the management system 202 and the connected device 204 upon receipt of confirmation. The transaction platform 102 may also transmit the payment confirmation to the connected device 204. In some examples, the transaction platform 102 may then close at least the integrated session 304. Additionally, the transaction platform may close the first session 302.

Figure 4:
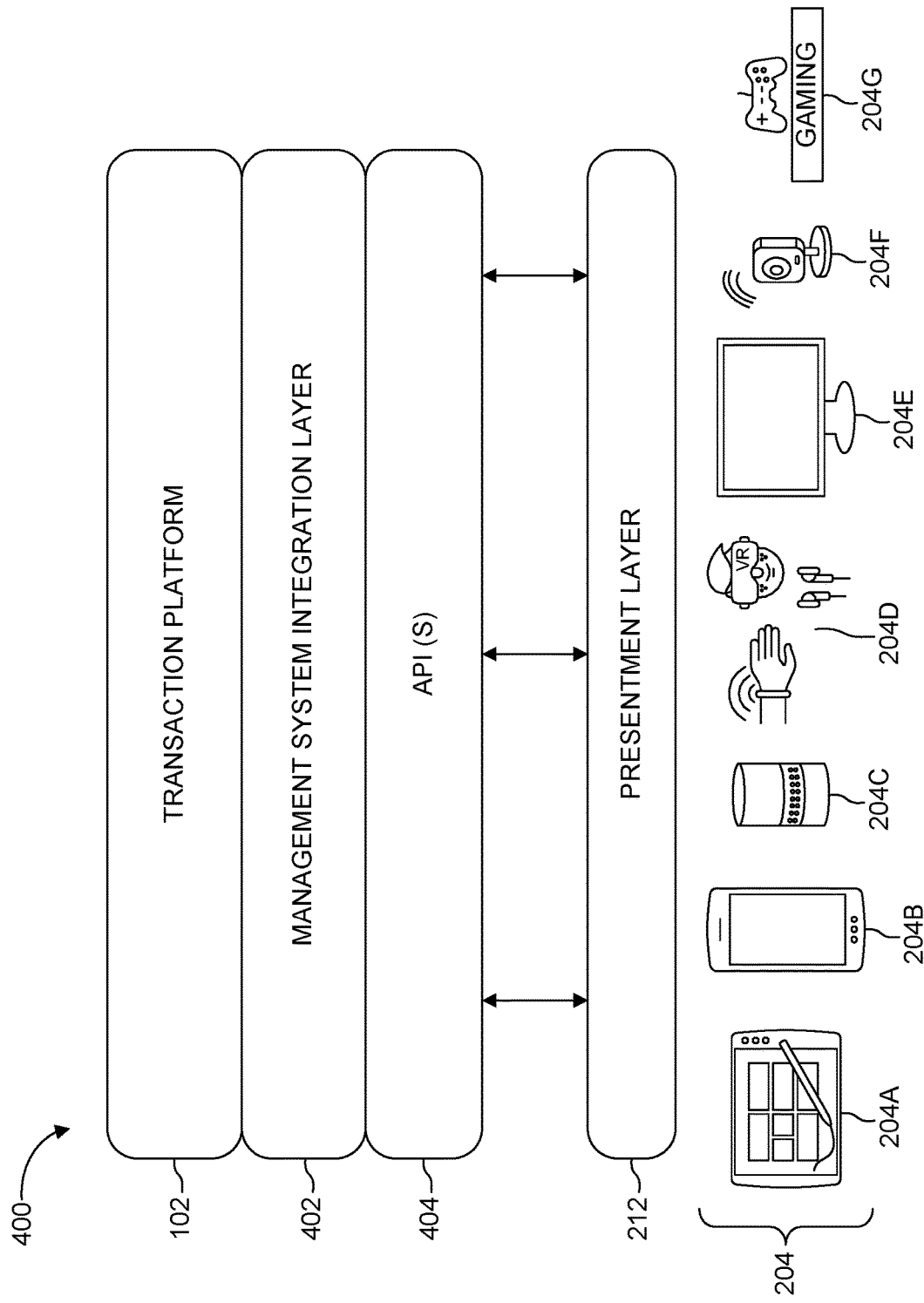
FIG. 4 is a conceptual diagram of various layers of the transaction platform.

FIG. 4 is a conceptual diagram 400 of various layers of the transaction platform 102. The transaction platform 102 may include at least a management system integration layer 402 and one or more APIs 404 that may be utilized by the transaction platform 102 to generate the presentment layer 212 provided to the connected device 204 and/or enable interaction with the connected device 204 and payment processing systems, such as payment processing system 205, throughout the transaction. As illustrated, the connected device 204 may be any type of IOT connected device, including but not limited to a tablet 204A, a smart phone 204B, a voice enabled device 204C, a wearable computing device 204D (e.g., a smart watch, smart ear buds, or augmented reality (AR) or virtual reality (VR) devices, among other similar wearables), a smart television 204E, a smart camera 204F and a gaming console or device 204G.

The management system integration layer 402 includes integration logic from a management system communicatively connected to the transaction platform 102, such as the management system 202. The integration logic includes information related to functionalities or sub-systems of the management system 202, and the features thereof. In some examples, the logic may be integrated via APIs. At least some of the features of the management system 202 may be incorporated within the presentment layer 212, where the features may be dependent on a type of a transaction occurring between the management system 202 and the connected device 204 receiving the presentment layer 212.

For example, if the management system 202 is a restaurant management system, various functionalities or sub-systems of the restaurant management system can include the following: front of house, back of the house, digital menu, POS, inventory, analytics, reservations, and marketing loyalty, among other similar examples. Depending on the type of transaction one or more features of these functionalities or sub-systems can be provided through the presentment layer 212 via the integrated session or at least communicatively coupled to (and thus able to receive data and communications from) the transaction platform (e.g., via the established first session described with reference to FIG. 2). To provide a more specific example, if the transaction is an ongoing, dine-in transaction at the restaurant, the following features from the various functionalities or sub-systems may be provided within the presentment layer 212: view a menu (digital menu), order items from the menu (front of the house), request assistance (front of house), view an invoice (POS), and pay for the invoice (POS), among other examples. Alternatively, if the transaction is a one-time order ahead and takeout transaction at the restaurant, only features related to ordering, viewing, and paying for the invoice may be provided within the presentment layer 212.

The APIs 404 may facilitate connection of devices, domains, management systems, environments, accounts and/or users of the devices and their software. Example APIs 404 implemented by the transaction platform 102 may include APIs for POS systems, entity-specific POS systems (e.g., restaurant POS systems, hotel POS systems, stadium/arena POS systems), payments engine systems, merchant processing systems, marketing loyalty systems, payment gateways, payment processing systems, and electronic commerce (ecommerce) systems, among other examples. A portion of the APIs can be systems hosted by a same service as the transaction platform 102. Additionally, a portion of the APIs may be based on the type of the management system 202 and external systems (e.g., POS systems, ecommerce systems, etc.) used in association with the management system 202.

Figure 5:
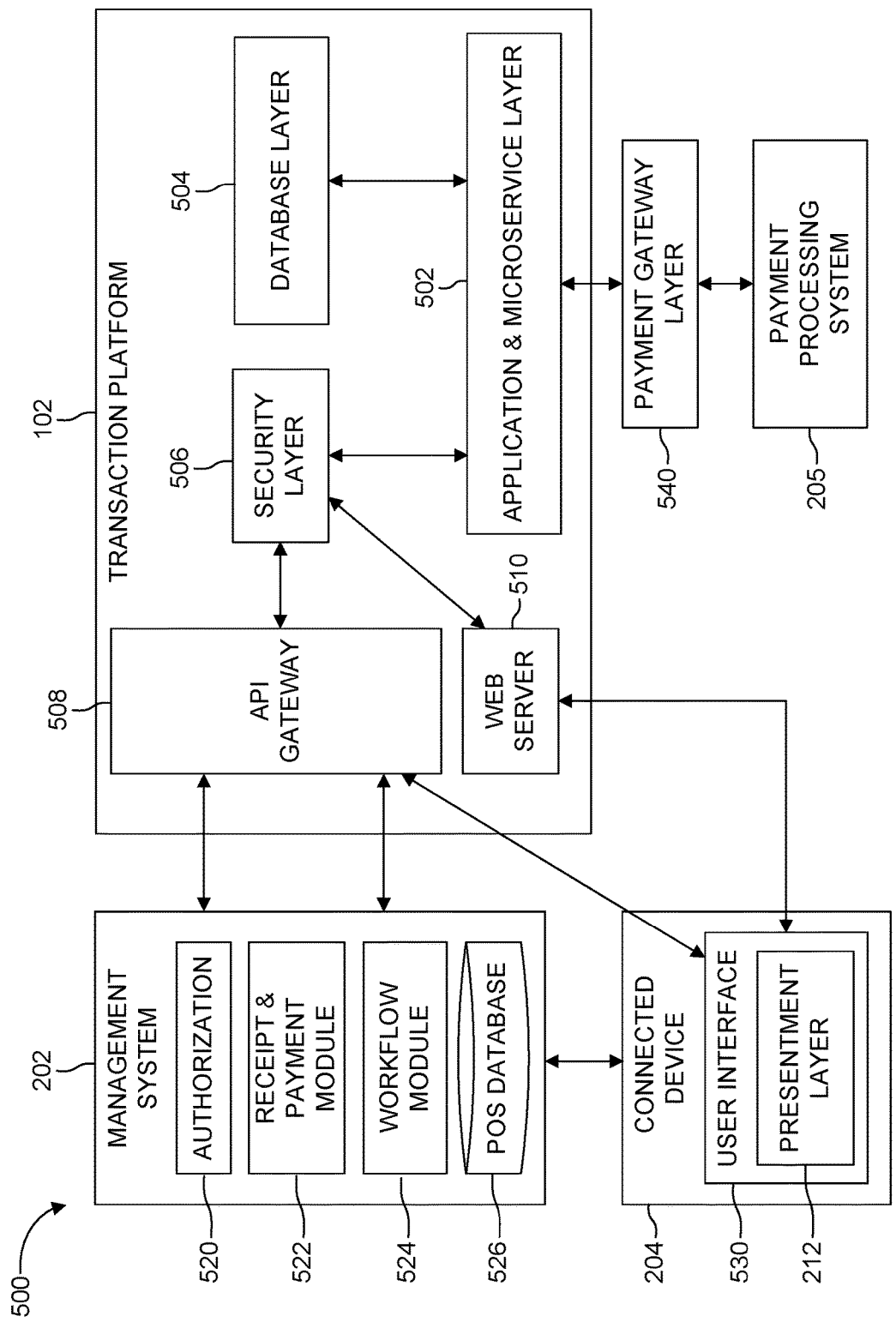
FIG. 5 is a block diagram illustrating components of the ambient transaction system.

FIG. 5 is a block diagram 500 illustrating components of the ambient transaction system 200. As previously discussed with reference to FIG. 2 and FIG. 3, the ambient transaction system 200 includes the transaction platform 102, the management system 202 and the connected device 204 communicatively coupled to the transaction platform 102, and the payment processing system 205 communicatively coupled to the transaction platform 102.

The transaction platform 102 includes: an application and microservice layer 502 providing main functionalities of the transaction platform 102, including generation of the presentment layer 212, as described in greater detail below; a database layer 504 for storing various data associated with the transaction platform 102; a security layer 506 to establish a secure, tokenized integrated session among the transaction platform 102, the management system 202, and the connected device 204; and an application programming interface (API) gateway 508 and a web server 510 for facilitating communication with the management system 202 and the connected device 204.

The management system 202 (and particularly a backend of the management system 202) includes an authorization component 520 enabling access to the management system 202 and data stored thereon, a receipt and payment module 522 for recording current transactions, a workflow module 524 for managing additional (e.g., non-payment) aspects of the entity associated with management system 202, and a POS database 526 for storing data related to the POS system associated with and/or integrated within the management system 202.

The connected device 204 includes a user interface 530 through which the presentment layer 212 generated by the transaction platform 102 may be displayed.

A payment gateway layer 540 communicatively couples the transaction platform 102 to the payment processing system 205 via the payment gateway 206 of the payment processing system 205. In other embodiments, where the transaction is a non-payment transaction, for example, the transaction platform 102 may instead be communicatively coupled to a transaction processing system associated with a particular type of the non-payment transaction via a transaction gateway layer corresponding to the transaction processing system.

Figure 6:
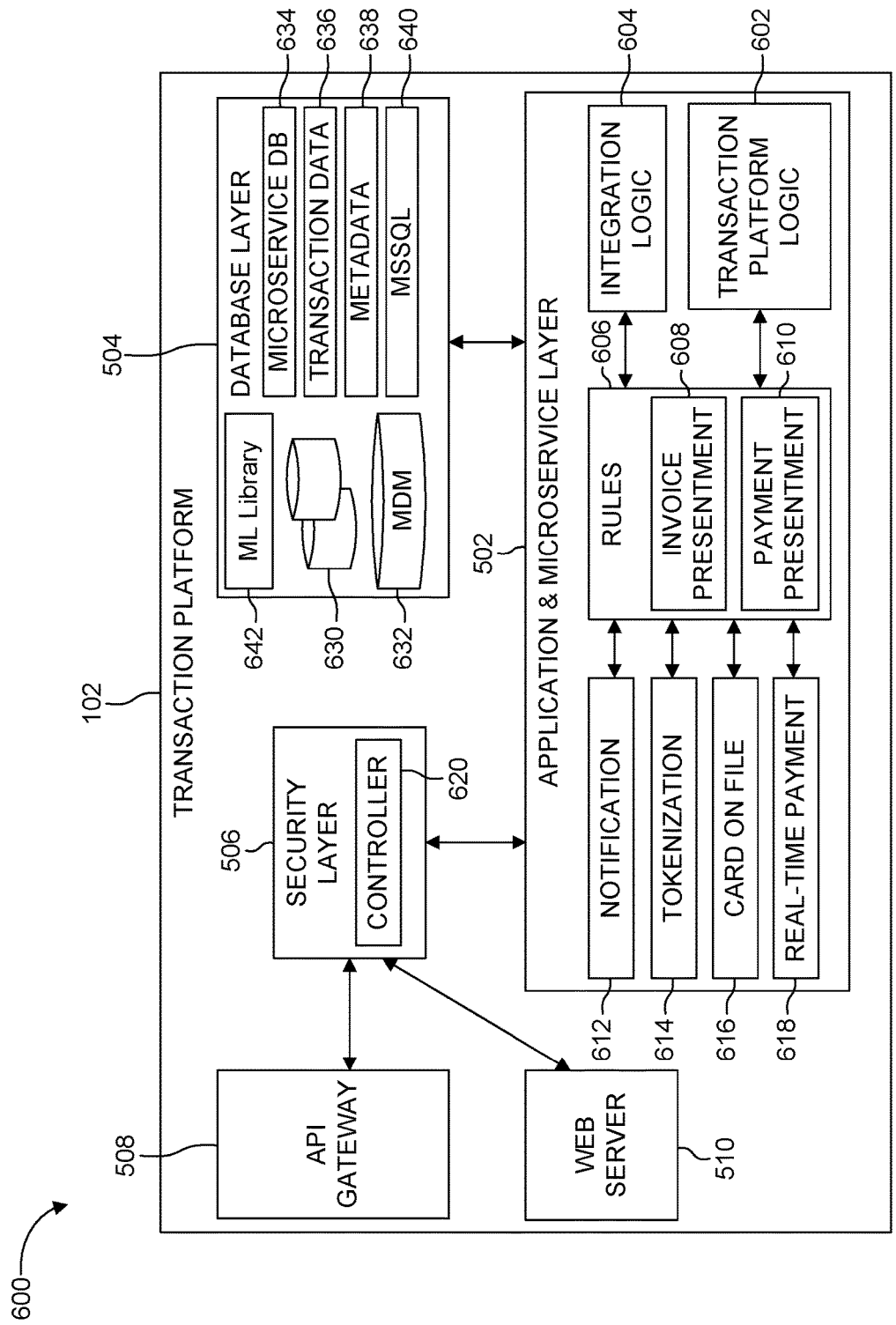
FIG. 6 is a block diagram illustrating components of the transaction platform of the ambient transaction system described in FIG. 5.

FIG. 6 is a block diagram 600 illustrating components of the transaction platform 102 of the ambient transaction system 200 described in FIG. 5. The application and microservice layer 502 may include transaction platform logic 602, integration logic 604 of the management system 202 (e.g., management system integration layer 402 described with reference to FIG. 2), and a rules component 606 including invoice presentment rules 608 and payment presentment rules 610 for generating the presentment layer 212. The application and microservice layer 502 may further include a notification framework 612 to control communications or messages pushed to one or more of the management system 202 and the connected device 204, a tokenization component 614 to maintain the uniqueness and security of the integrated session, and payment-related components including a card on file component 616 and a real-time payment component 618.

The security layer 506 may include one or more controllers 620 for managing one or more security tools and/or protocols to establish a secure, integrated session among the transaction platform 102, the management system 202, and the connected device 204. For example, the controllers 620 may control one or more application performance management (APM) tools and/or 3D Secure 2 (3DS2) authentication protocols, among other similar authentication protocols.

The database layer 504 may include one or more databases 630, a database for storing mobile device management (MDM)-related data 632, and a microservice database 634 for storing data related to the application and microservice layer 502. The database layer 504 may also include storage for transaction-related data 636, storage for metadata 638, and a relational database management system, such Microsoft SQL Server (MSSQL) 640. The database layer 504 may further includes a machine-learning (ML) library 642 (e.g., an open source library or platform), where transaction data from the storage for transaction-related data 636, for example, may be collected and analyzed using machine-learning techniques to learn transaction patterns.

The machine-learning techniques may include unsupervised clustering of transaction activity, merchant data, and merchant activity, as well as supervised regression analysis. The machine-learning techniques implemented may enable fraud prediction as well prediction of best-cost processing and best price/timing to complete the transaction if the transaction is not a real time transaction. Further, the machine-learning techniques and resulting predictions thereof can be used to optimize features to meet the needs of participants of the transaction platform 102 and elevate the ambient transaction system 200 as a whole. For example, the 3DS2 features and other anti-fraud features controlled by controllers 620 may increasingly leverage the fraud predictions to enhance and optimize security across the ambient transaction system 200.

Describing FIGS. 5 and 6 concurrently, the management system 202 may transmit a request to establish a first session with the transaction platform 102. The request indicates that there is an active transaction between the management system 202 and another device (e.g., the connected device 204), including a type of the transaction. The request may also include an identifier of the connected device 204 that is involved in the transaction. The request is transmitted as a call to the API gateway 508 of the transaction platform using Hypertext Transfer Protocol Secure (HTTPS), where the communication protocol is encrypted using Secure Sockets Layer (SSL), hereinafter referred to as an HTTPS/SSL connection.

The session may then be authenticated by the security layer 506 of the transaction platform 102 to generate a unique, tokenized session. The unique, tokenized session may be the integrated session between the transaction platform 102, the management system, and the connected device.

Following authentication and establishment of the integrated session, the integration logic 604 of the management system 202 is executed in the application and microservice layer 502 of the transaction platform 102, where the integration logic 604 may be pre-built by the transaction platform 102 as the point of sale for the transaction between the management system 202 and other devices, including the connected device 204. The integration logic 604 may instruct the application and microservice layer 502 to provide, via the transaction platform 102, a plurality of features of the management system 202 to the connected device 204 via the presentment layer 212 that allow negotiation of and interaction with the transaction through the connected device 204. The features provided within the presentment layer 212 may be based on one or more rules from the rules component 606, including at least the invoice presentment rules 608 and the payment presentment rules 610.

The features to be provided via the presentment layer 212 may be pushed from the application and microservice layer 502 through the security layer 506 and out the API gateway 508 to the connected device. The presentment layer 212 can be provided within the user interface 530 of a native mobile application, a voice-based application (e.g., a digital assistant application), a digital game or other similar gaming application (e.g., augmented reality, virtual reality, or extended reality applications). In other examples, instead of the API gateway 508, the features to be provided via the presentment layer 212 may instead be provided via the web server 510. The web server 510 may provide a mobile optimized web application user interface as the user interface 530. In some examples, the web application user interface displays a hosted payments page comprising the features.

In some examples, because the integrated session is securely established via the API gateway 508, the connected device 204 can interact directly with the management system 202 utilizing features of the presentment layer 212. For example, one of the features may include a functionality to add additional items to the invoice. Selection of the feature to add an additional item to the invoice through the presentment layer 212 displayed via the user interface 530 on the connected device 204 may push the message directly to the management system 202 rather than indirectly via the transaction platform 102.

When a transaction is to be completed, the connected device 204 may utilize payment features provided through the presentment layer 212 to select a payment method via the connected device 204. Information associated with the selected payment method is pushed, via the integrated session, from the connected device 204 to the API gateway 508, through the security layer 506 and the application and microservice layer 502, and out to the payment gateway layer 540. The payment gateway layer 540 may then provide the payment information along with an invoice amount (e.g., pushed from the receipt and payment module 522 of the management system 202, to the API gateway 508, through the security layer 506 and the application and microservice layer 502, and out to the payment gateway layer 540) to the payment processing system 205 to authorize the payment.

Upon authorization the payment gateway layer may push a confirmation of the payment received from the payment processing system 205 to the application and microservice layer 502. The confirmation may then be further pushed from the application and microservice layer 502 through the security layer and out through API gateway 508 to at least the management system 202. In some example, the confirmation may also be pushed from the application and microservice layer 502 through the security layer 506 and out through API gateway 508 and/or the web server 510 to the connected device 204.

The integrated session among the transaction platform 102, the management system 202 and the connected device 204 may then be closed.

Figure 7:
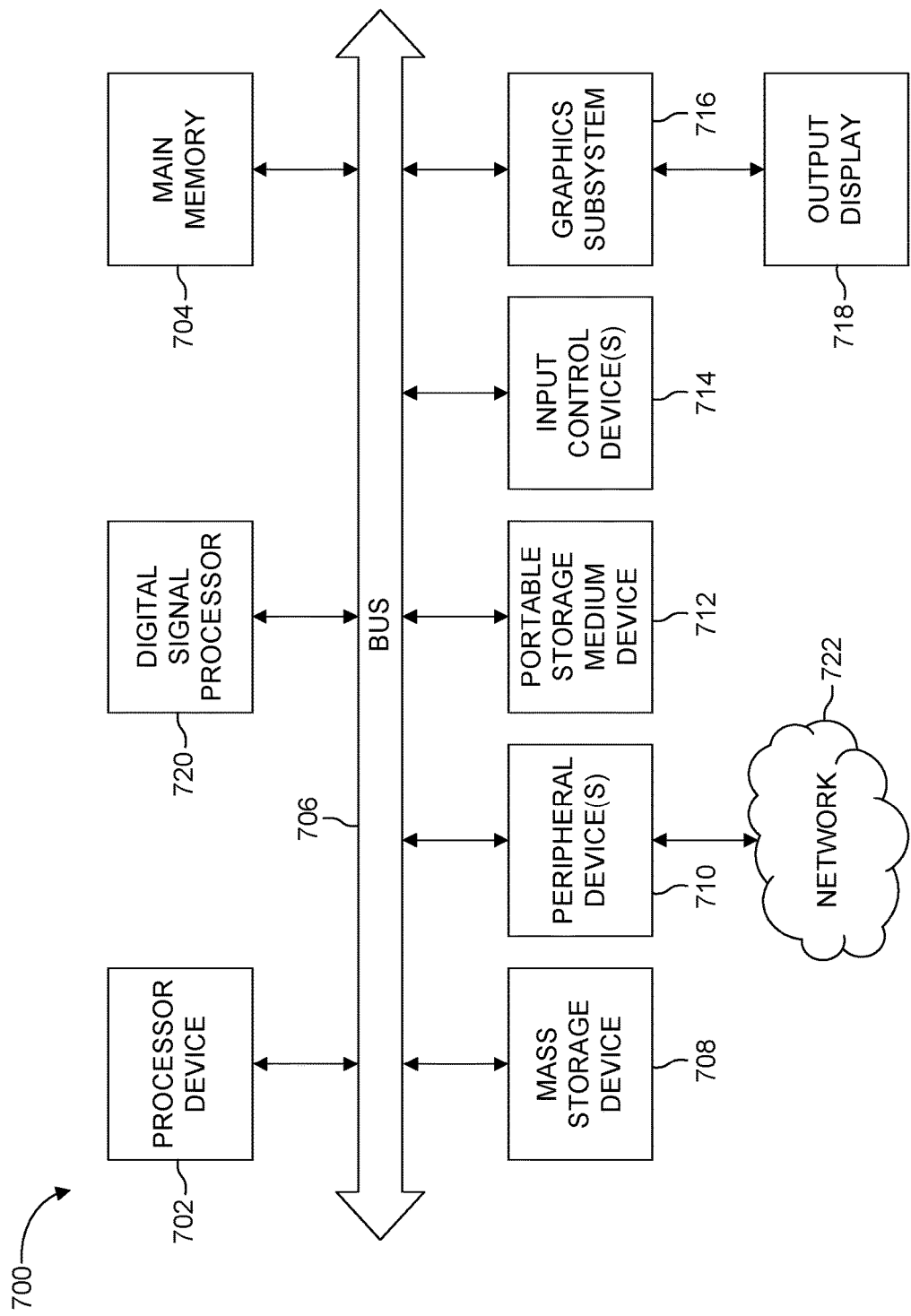
FIG. 7 is a block diagram showing an example computation system constructed to realize the functionality of the example embodiments described herein.

FIG. 7 is a block diagram showing an example computation system 700 constructed to realize the functionality of the example embodiments described herein. This example computation system could be the server 104 that is hosting the transaction platform 102, the first client 106, the second client 108, the device executing the management system 202, and/or the connected device 204.

The computation system 700 may include without limitation a processor device 702, a main memory 704, and an interconnect bus 706. The processor device 702 may include without limitation a single microprocessor, or may include a plurality of microprocessors for configuring the system 700 as a multi-processor computation system. The main memory 704 stores, among other things, instructions and/or data for execution by the processor device 702. The main memory 704 may include banks of dynamic random access memory (DRAM), as well as cache memory.

The system 700 may further include a mass storage device 708, peripheral device(s) 710, portable non-transitory storage medium device(s) 712, input control device(s) 714, a graphics subsystem 716, and/or an output display 718. A digital signal processor 720 may also be included to perform audio signal processing. For explanatory purposes, all components in the system 700 are shown in FIG. 7 as being coupled via the bus 706. However, the system 700 is not so limited. Elements of the system 700 may be coupled via one or more data transport means. For example, the processor device 702, the digital signal processor 720 and/or the main memory 704 may be coupled via a local microprocessor bus. The mass storage device 708, peripheral device(s) 710, portable storage medium device(s) 712, and/or graphics subsystem 714 may be coupled via one or more input/output (I/O) buses. The mass storage device 708 may be a nonvolatile storage device for storing data and/or instructions for use by the processor device 702. The mass storage device 708 may be implemented, for example, with a magnetic disk drive or an optical disk drive. In a software embodiment, the mass storage device 708 is configured for loading contents of the mass storage device 708 into the main memory 704.

The portable storage medium device 712 operates in conjunction with a nonvolatile portable storage medium, such as, for example, a solid state drive (SSD), to input and output data and code to and from the system 700. In some embodiments, the software for storing information may be stored on a portable storage medium, and may be inputted into the system 700 via the portable storage medium device 712. The peripheral device(s) 710 may include any type of computer support device, such as, for example, an input/output (I/O) interface configured to add additional functionality to the system 700. For example, the peripheral device(s) 710 may include a network interface card for interfacing the system 700 with a network 722 (e.g., the network 110)

The input control device(s) 714 provide a portion of the user interface for a user of the system 700. The input control device(s) 714 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 700 may include the graphics subsystem 716 and the output display 718. The output display 718 may include a display such as a CSTN (Color Super Twisted Nematic), TFT (Thin Film Transistor), TFD (Thin Film Diode), OLED (Organic Light-Emitting Diode), AMOLED display (Activematrix Organic Light-emitting Diode), and/or liquid crystal display (LCD)-type displays. The displays can also be touchscreen displays, such as capacitive and resistive-type touchscreen displays. The graphics subsystem 716 receives textual and graphical information, and processes the information for output to the output display 1718

The following examples provided in FIGS. 8 to 16 illustrate a variety of implementations of the ambient transaction system 200, including a variety of different triggering conditions for establishment of an integrated session, types of presentment layers provided, and payment types that can be facilitated. These implementations are merely illustrative examples, representing a non-exclusive, non-exhaustive set of implementations.

Figure 8:
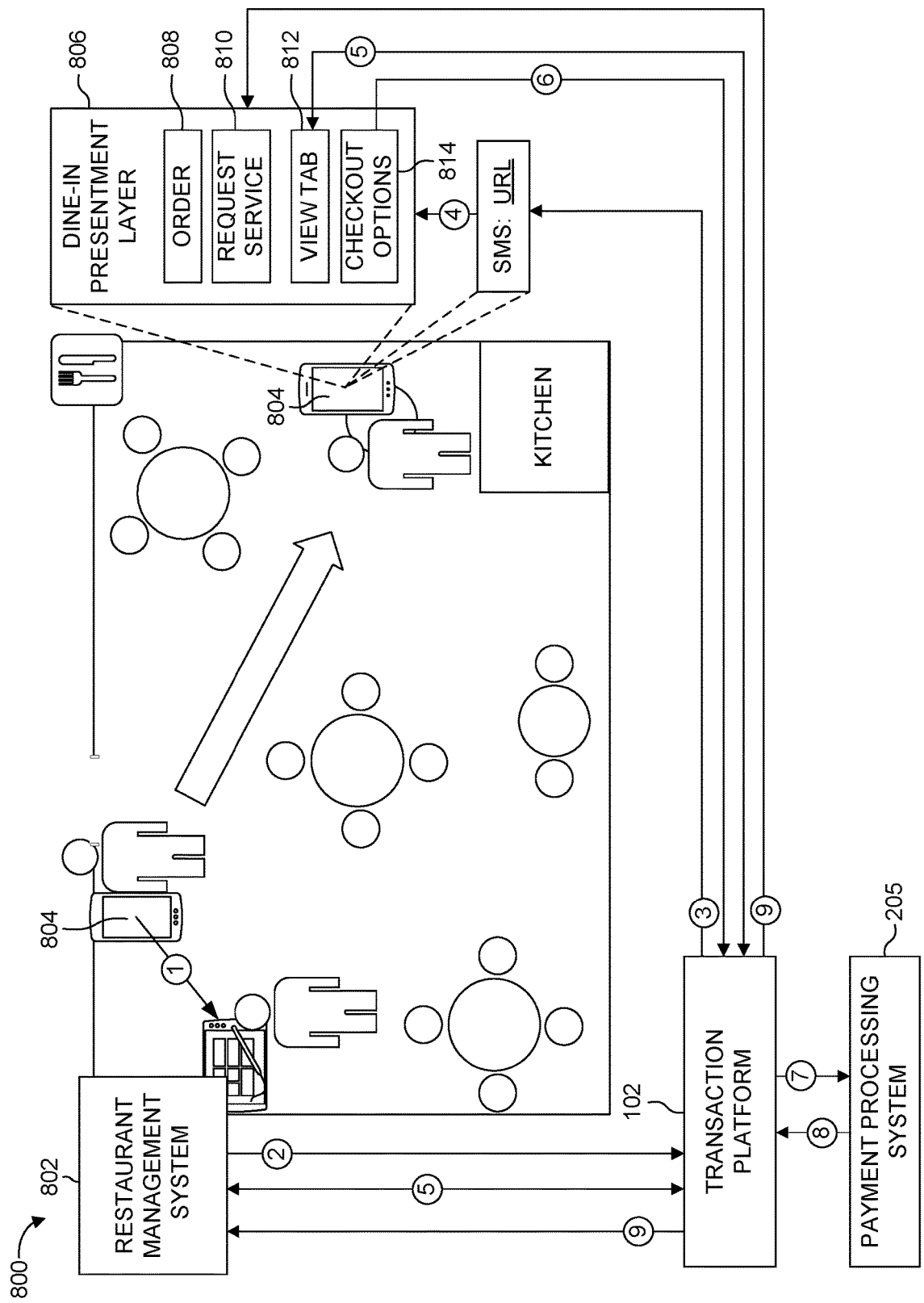
FIG. 8 conceptually illustrates an example use of the ambient transaction system to facilitate a dine-in restaurant transaction.

FIG. 8 illustrates an example use of an ambient transaction system 800 to facilitate a dine-in restaurant transaction. The ambient transaction system 800 may be similar to the ambient transaction system 200, where a management system of a restaurant (e.g., restaurant management system 802) and a connected device of a diner (e.g., diner's smart phone 804) can participate in an ongoing transaction over the transaction platform 102 throughout the dining experience.

Step 1: The diner enters the restaurant and speaks with the host to request a table. The host requests a mobile number of the diner's smart phone 804 and inputs the mobile number into the restaurant management system 802, which assigns the mobile number to the table at which the diner is seated. In some examples, if the diner has made reservations through a third party application communicatively coupled to the restaurant management system 802 and included the mobile number as part of the reservation process, the restaurant management system 802 may automatically assign the mobile number to the table upon receipt of the reservations from the third party application.

Step 2: The restaurant management system 802 transmits a request to establish a first session with the transaction platform 102, where the mobile number of the diner's smart phone 804 is provided as part of or along with the request. In response to the request, the transaction platform 102 establishes a first session with the restaurant management system 802 in addition to an integrated session among the restaurant management system 802, the diner's smart phone 804, and the transaction platform 102.

Step 3: The transaction platform 102 pushes a communication to the diner's smart phone 804 to provide, via the integrated session, a presentment layer associated with the ongoing transaction between the restaurant management system 802 and the diner's smart phone 804, where the presentment layer may be specific to the ongoing transaction (e.g., a dine-in presentment layer 806). As one example, the communication is a text message that includes a selectable URL directing to a hosted payments page providing the dine-in presentment layer 806.

Step 4: The URL, upon selection, causes the hosted payments page providing the dine-in presentment layer 806 to be displayed on the diner's smart phone 804. The hosted payments page may be displayed within a web application user interface (e.g., via a web browser) on the diner's smart phone 804. The dine-in presentment layer 806 may include a plurality of features of the restaurant management system 802, where the features may also be tailored or specific for a type of the transaction (e.g., a dine-in transaction). Example features may include features that support online ordering 808, interaction with a server 810, viewing of a tab 812, and a variety of mobile checkout options 814 via the diner's smart phone 804.

Step 5: Once the diner has completed their meal, the diner may select the view tab feature 812 of the dine-in presentment layer 806 displayed via the hosted payments page on the diner's smart phone 804. In some examples, and as illustrated, the selection of the view tab feature 812 may cause transmission of a communication to the transaction platform 102 to request the current tab. The transaction platform 102 may retrieve the current tab from the restaurant management system 802 and push back a communication comprising the current tab for display through the dine-in presentment layer 806 on the diner's smart phone 804. In other examples, the diner's smart phone 804 may interact directly with the restaurant management system 802 via the integrated session. Therefore, the selection of the view tab feature 812 may cause transmission of a communication directly from the diner's smart phone 804 to the restaurant management system 802 request the current tab, and the restaurant management system 802 can then provide the current tab via a return communication to the diner's smart phone 804.

In some embodiments, each time a part of the diner's order is input into the restaurant management system 802 by the server (e.g., drinks, apps, entrees, desserts) or via the online ordering feature 808 accessible on the diner's smart phone 804, the tab is updated and pushed to the diner's smart phone 804 using one of the methods described above, which the diner can view at their convenience by selecting the view tab feature 812, if desired.

Step 6: The diner can then utilize the checkout options feature 814 of the dine-in presentment layer 806 displayed via the hosted payments page on the diner's smart phone 804 to manually checkout (e.g., split the tab with one or more other diners, add a tip, and pay the tab). In one example, the diner may select to pay the tab utilizing a digital wallet installed on the diner's smart phone 804. Selection of a payment method via the checkout options feature 814 of the dine-in presentment layer 806 displayed via the hosted payments page on the diner's smart phone 804 causes transmission of a communication from the diner's smart phone 804 to the transaction platform 102 that indicates the payment method and associated information (e.g., digital wallet).

In other examples, the checkout may be automatic. For example, in response to detecting that a location of the diner's smart phone 804 is now outside of the restaurant premises (e.g., using geofencing or other similar technology), predefined settings including payment method and tip may be automatically applied to the tab to complete the transaction. In some examples, other predefined actions may also be taken by the transaction platform 102, such as sending a notification to the restaurant management system 802 that the diner has left. This enables the diner freedom to get up and leave at any time, while providing assurance to the restaurant that payment for the tab will be received.

Step 7: The transaction platform 102 transmits a communication with the payment information to the payment processing system 205 (e.g., via a gateway that routes the payment information to a correct payment processing system based on the payment method selected). Step 8: The payment processing system 205 then provides a confirmation that the funds are available, and thus the payment is authorized, via a return communication to the transaction platform 102. Step 9: The transaction platform 102 may then send communications regarding the confirmation to one or more of the restaurant management system 802 and the diner's smart phone 804. The transaction platform 102 may close at least the integrated session. The transaction platform 102 may also close the first session.

Figure 9:
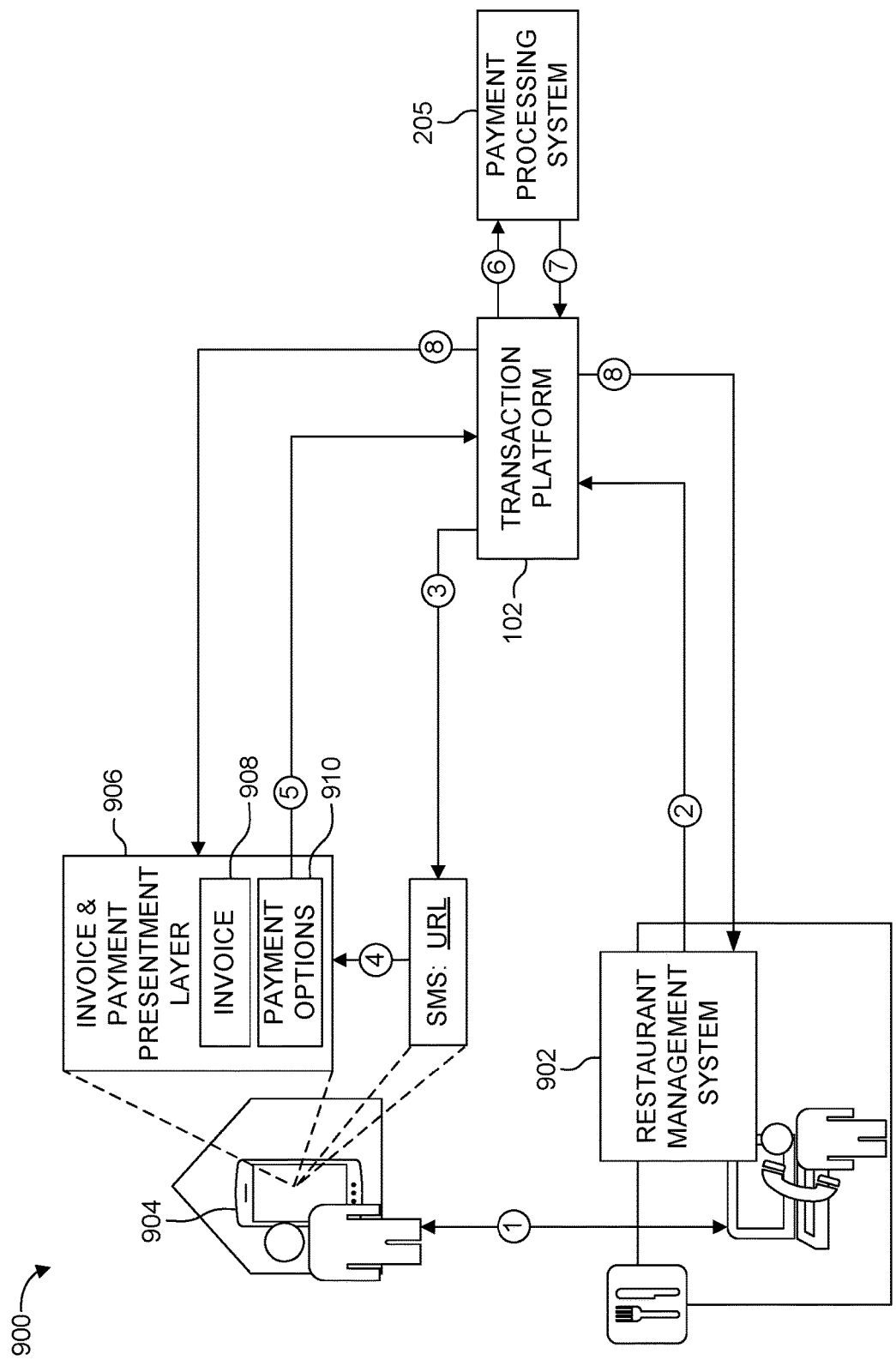
FIG. 9 conceptually illustrates an example use of the ambient transaction system to facilitate a takeout restaurant transaction.

FIG. 9 conceptually illustrates an example use of an ambient transaction system 900 to facilitate a takeout restaurant transaction. The ambient transaction system 900 may be similar to the ambient transaction system 200, where a management system of a restaurant (e.g., restaurant management system 902) and a connected device of a takeout customer (e.g., customer's smart phone 904) can participate in a one-time transaction over the transaction platform 102 to pay for a takeout order. This one-time transaction is an example of a mail-order/telephone-order (MOTO) transaction.

Step 1: The customer calls the restaurant, using the customer's smart phone 904 or another communication device, and places a takeout order. An employee of the restaurant participating in the call with the customer enters the takeout order into the restaurant management system 902 and requests a mobile number of a mobile communication device of the customer, such as the customer's smart phone 904. The employee then indicates to the customer that the takeout order will be ready in about 20 minutes and that the customer's smart phone 904 will be receiving a text message with a URL link to pay for the takeout order directly via the customer's smart phone 904. The employee and customer end the call.

Step 2: Upon receipt of the takeout order and mobile number input by the employee, the restaurant management system 902 transmits a request to establish a first session with the transaction platform 102, where the mobile number of the customer's smart phone 904 is provided as part of or along with the request. In response to the request, the transaction platform 102 establishes a first session with the restaurant management system 902 in addition to an integrated session among the restaurant management system 902, the customer's smart phone 904, and the transaction platform 102.

Step 3: The transaction platform 102 pushes a communication to the customer's smart phone 904 to provide, via the integrated session, a presentment layer associated with the one-time transaction between the restaurant management system 902 and the customer's smart phone 904, where the presentment layer may be specific to the one-time transaction (e.g., an invoice and payment presentment layer 906). As one example, the communication is a text message that includes a selectable URL directing to a hosted payments page providing the invoice and payment presentment layer 906. The hosted payments page may be displayed within a web application user interface (e.g., a web browser) on the customer's smart phone 904.

Step 4: The URL, upon selection, causes the hosted payments page providing the invoice and payment presentment layer 906 to be displayed on the customer's smart phone 904. The invoice and payment presentment layer 906 may include an invoice feature 908 through which the final total of the take-order may be viewed and a payment feature 910 providing a variety of mobile checkout options via the customer's smart phone 904.

Step 5: The customer can then utilize the checkout options provided through the payment feature 910 of the invoice and payment presentment layer 906 displayed via the hosted payments page on the customer's smart phone 904 to split the tab with one or more other persons, add a tip, and pay the invoice. In one example, the customer can enter their credit card information or select a card on file on the customer's smart phone 904. Selection of a payment method via the payment feature 910 of the invoice and payment presentment layer 906 displayed via the hosted payments page on the customer's smart phone 904 causes transmission of a communication from the customer's smart phone 904 to the transaction platform 102 that indicates the payment method and associated information (e.g., credit card information).

Step 6: The transaction platform 102 transmits a communication with the payment information to the payment processing system 205 (e.g., via a gateway that routes the payment information to a correct payment processing system based on the payment method selected). Step 7: The payment processing system 205 then provides a confirmation that the funds are available, and thus the payment is authorized, via a return communication to the transaction platform 102. Step 9: The transaction platform 102 may then send communications regarding the confirmation to one or more of the restaurant management system 902 and the customer's smart phone 904. The transaction platform 102 may close at least the integrated session. The transaction platform 102 may also close the first session.

Utilizing the ambient transaction system, the takeout order may be paid for by the customer and confirmed prior to pick up without having to provide the payment information over the communication device to the employee of the restaurant when placing the takeout order (e.g., a less secure method).

Figure 10:
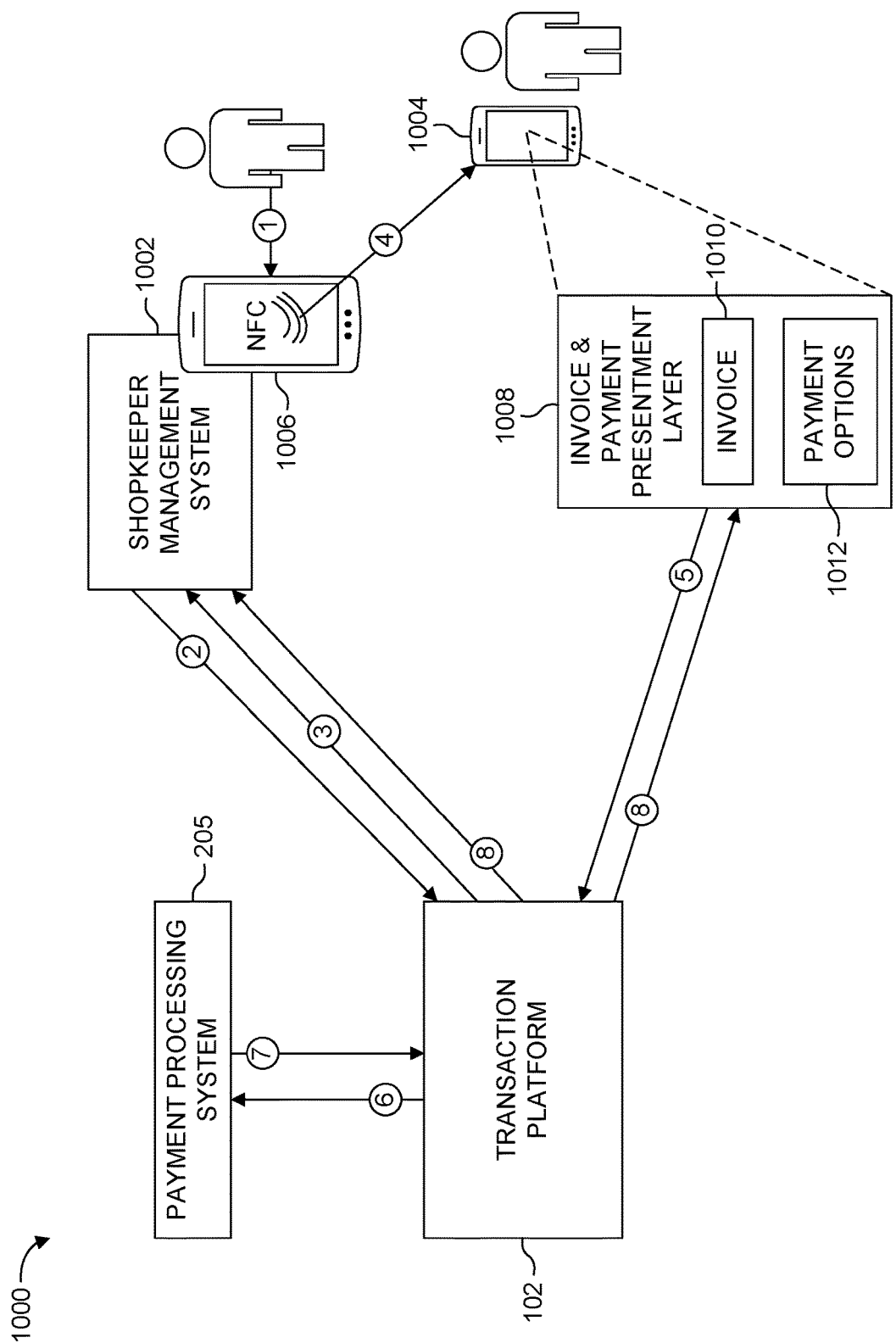
FIG. 10 conceptually illustrates an example use of the ambient transaction system to facilitate a shopkeeper transaction.

FIG. 10 conceptually illustrates an example use of an ambient transaction system 1000 to facilitate a shopkeeper transaction. The ambient transaction system 1000 may be similar to the ambient transaction system 200, where a management system of a shopkeeper (e.g., shopkeeper management system 1002) and a connected device of a shopper (e.g., customer's smart phone 1004) can participate in a one-time transaction over the transaction platform 102 to pay for a good the customer purchases from the shopkeeper. As illustrated, the shopkeeper management system 1002 may be executing on a mobile device of the shopkeeper, such as the shopkeeper's smart phone 1006 that is NFC enabled. In other examples, the shopkeeper management system 1002 may be implemented as a biometric device, smart camera, or a geofence enabled door, among other example IoT devices. The customer's smart phone 1004 may similarly be NFC enabled.

As one example scenario, the shopper arrives at an open-air marketplace at which the shopkeeper sells handmade goods. The shopper selects several of the handmade goods to purchase and approaches the shopkeeper to check out. Step 1: The shopkeeper rings-up (e.g., inputs) the order for the handmade goods on the shopkeeper's smart phone 1006 using the shopkeeper management system 1002 executing thereon.

Step 2: The shopkeeper management system 1002, upon receiving the input for order, transmits a request to establish a first session with the transaction platform 102. In response to the request, the transaction platform 102 establishes the first session with the shopkeeper management system 1002.

Step 3: Additionally, the transaction platform 102 may provide to the shopkeeper management system 1002 a link to a presentment layer that is to be transmitted from the shopper's smart phone 1004 to the shopper's smart phone 1004 to enable establishment of an integrated session among the shopkeeper management system 1002, the shopper's smart phone 1004, and the transaction platform 102. In this example, the link may be an NFC tap. However, as previously discussed the link may encompass other link types, such as a barcode, QR code, electronic mail, text message, BLE or other wireless communication, voice assistance request or natural language phrase, a geolocation detection (in physical or virtual space), and virtual game objects or action codes. Additionally, other presentment connectivity technologies other than a link may trigger provision of the presentment layer, such as sensors, radio waves (e.g., beacons, geofence, etc.), camera detection, sound detection (e.g., speakers, voice, ultra, and subsonic), and biometrics.

Step 4: For example, the shopkeeper's smart phone 1006 may be moved within a distance of the shopper's smart phone 1004 necessary for NFC communication. The shopkeeper's smart phone 1006 may then transmit the link to the presentment layer, via NFC, to the shopper's smart phone 1004. The presentment layer may be automatically launched and displayed via a hosted payment page on the shopper's smart phone 1004 upon receipt. The hosted payments page may be displayed within a web application user interface (e.g., a web browser) on the shopper's smart phone 1004.

The presentment layer may be associated with the one-time transaction between the shopkeeper management system 1002 and the shopper's smart phone 1004, where the presentment layer may be specific to the one-time transaction (e.g., an invoice and payment presentment layer 1008). The invoice and payment presentment layer 1008 may include an invoice feature 1010 through which the invoice of the order may be viewed and a payment feature 1012 providing a variety of mobile checkout options via the shopper's smart phone 1004.

Step 5: The customer can then utilize the checkout options provided through the payment feature 1012 of the invoice and payment presentment layer 1008 displayed via the hosted payments page on the shopper's smart phone 1004 to pay the invoice. In one example, the shopper can select to pay using a default credit or debit card stored on a mobile wallet application executing on the shopper's smart phone 1004. In another example, in addition to or in place of the default credit or debit card, the shopper can select a coupon or loyalty points or other such acceptable tender. Selection of a payment method via the payment feature 1012 causes transmission of a communication from the shopper's smart phone 1004 to the transaction platform 102 that indicates the payment method and associated information (e.g., default card information from mobile wallet application).

Step 6: The transaction platform 102 transmits a communication with the payment information to the payment processing system 205 (e.g., via a gateway that routes the payment information to a correct payment processing system based on the payment method selected). Step 7: The payment processing system 205 then provides a confirmation that the funds are available, and thus the payment is authorized, via a return communication to the transaction platform 102. Step 9: The transaction platform 102 may then send communications regarding the confirmation to one or more of the shopkeeper management system 1002 and the shopper's smart phone 1004. In one example, the confirmation may be a unique code or link of specific payment of the invoice such that the shopkeeper, via the shopkeeper's smart phone 1006, can scan the customer's smart phone 1004, or the shopper can show the code, to prove payment when leaving the shopkeeper's store or marketplace. The transaction platform 102 may close at least the integrated session. The transaction platform 102 may also close the first session.

Figure 11:
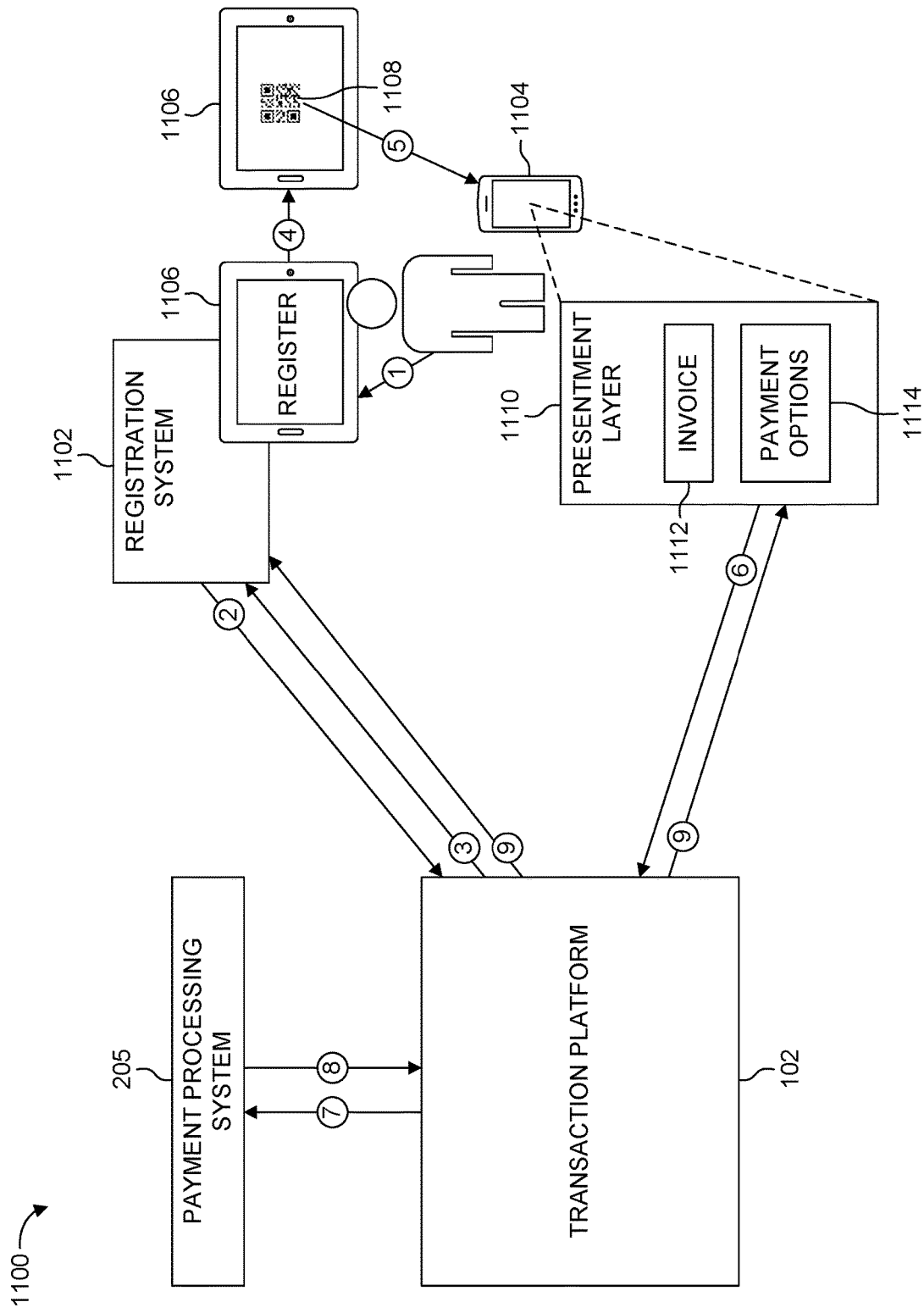
FIG. 11 conceptually illustrates an example use of the ambient transaction system to facilitate a registration fee transaction.

FIG. 11 conceptually illustrates an example use of an ambient transaction system 1100 to facilitate a registration fee transaction. The ambient transaction system 1100 may be similar to the ambient transaction system 200, where a registration system 1102 (e.g., a type of management system) and a connected device of a registrant (e.g., registrant's smart phone 1104) can participate in a one-time transaction over the transaction platform 102 for registration fee payment. The registration system 1102 may be executed on a mobile device, such as a tablet 1106.

In an example scenario, the registrant is a parent who is registering their two children for fall soccer at a local municipal park and recreational office. To register, the registrant is provided with the tablet 1106 to input information into one or more registration forms provided for display by the registration system 1102, such as a number of children, an age of the children, and a selected sport among other similar information.

Step 2: When the registration form is complete and submitted, the registration system 1102 may submit a request to establish a first session with the transaction platform 102, where at least a portion of the information from the registration form as well as a final invoice owed for the registration fee may be provided to the transaction platform 102 for use in generating a presentment layer. To enable establishment of an integrated session among the transaction platform 102, the registration system 1102, and the registrant's smart phone 1104, the transaction platform 102 may generate a machine readable code, such as a QR code 1108, that when scanned by a device, such as the registrant's smart phone 1104, causes the presentment layer to be displayed on the device via a hosted payments page.

Step 3: The transaction platform 102 may send the QR code 1108 within a communication to the registration system 1102. Step 4: Upon receipt, the registration system 1102 may cause display of the QR code 1108 on the tablet 1106. Step 5: The registrant's smart phone 1104 may scan the QR code 1108 being displayed on the tablet 1106 (e.g., via a code scanning application executing on the registrant's smart phone 1104). Scanning the QR code 1108 causes display of the presentment layer via a hosted payments page on the registrant's smart phone 1104. The hosted payments page may be displayed within a web application user interface (e.g., a web browser) on the registrant's smart phone 1104. The presentment layer may be associated with the one-time transaction between the registration system 1102 and the registrant's smart phone 1104, where the presentment layer may be specific to the one-time transaction (e.g., an invoice and payment presentment layer 1110). The invoice and payment presentment layer 1110 may include an invoice feature 1112 through which the invoice for the registration fee may be viewed and a payment feature 1114 providing a variety of mobile checkout options via the registrant's smart phone 1104.

Step 6: The customer can then utilize the checkout options provided through the payment feature 1114 of the invoice and payment presentment layer 1110 displayed via the hosted payments page on the registrant's smart phone 1104 to pay the invoice. Selection of a payment method via the payment feature 1114 causes transmission of a communication from the registrant's smart phone 1104 to the transaction platform 102 that indicates the payment method and associated information.

Step 7: The transaction platform 102 transmits a communication with the payment information to the payment processing system 205 (e.g., via a gateway that routes the payment information to a correct payment processing system based on the payment method selected). Step 8: The payment processing system 205 then provides a confirmation that the funds are available, and thus the payment is authorized, via a return communication to the transaction platform 102. Step 9: The transaction platform 102 may then send communications regarding the confirmation to one or more of the registration system 1102 and the registrant's smart phone 1104. The transaction platform 102 may close at least the integrated session. The transaction platform 102 may also close the first session.

Figure 12:
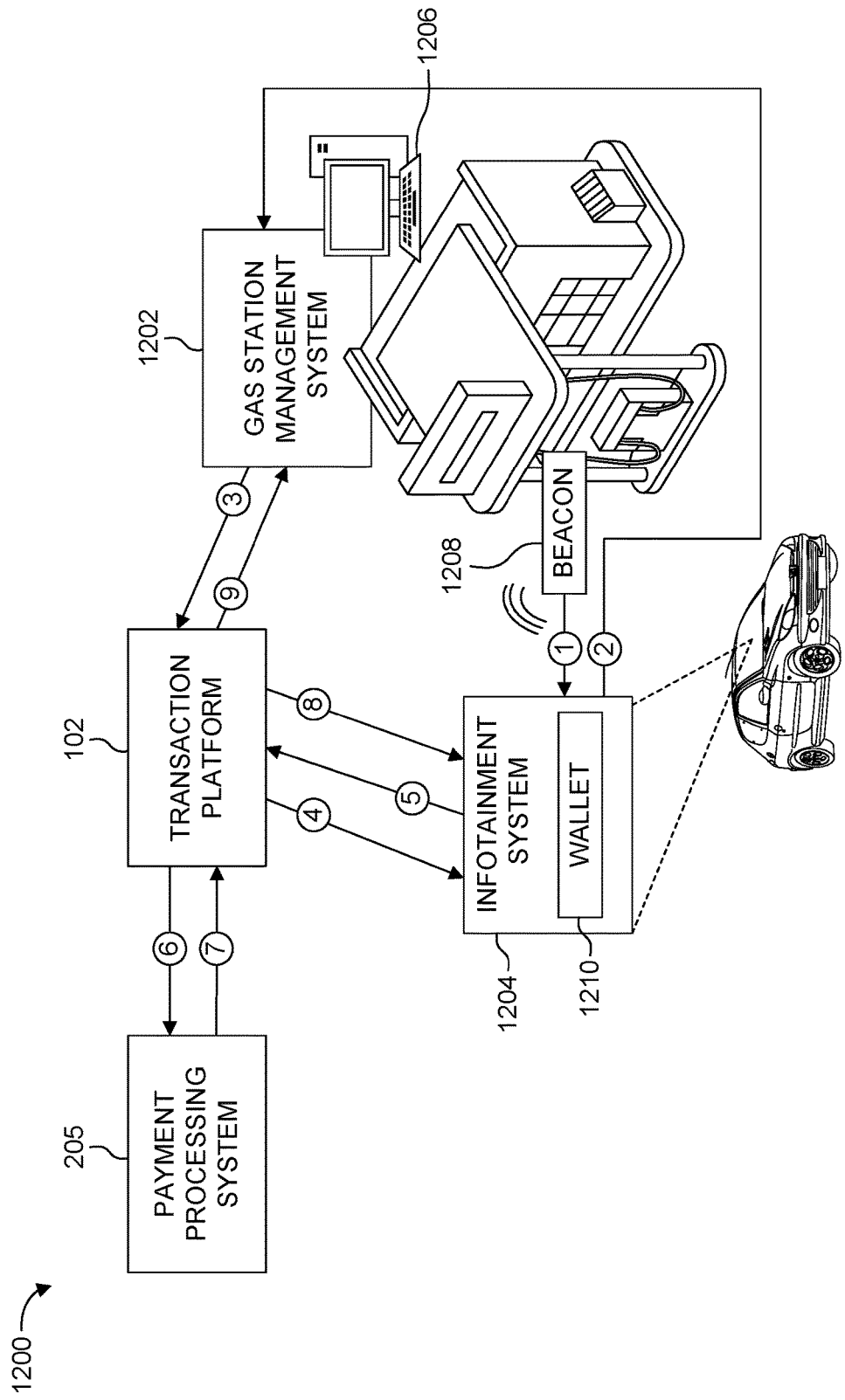
FIG. 12 conceptually illustrates an example use of the ambient transaction system to facilitate a fuel transaction.

FIG. 12 conceptually illustrates an example use of an ambient transaction system 1200 to facilitate a fuel transaction. The ambient transaction system 1200 may be similar to the ambient transaction system 200, where a management system of a gas station (e.g., gas station management system 1202) and a connected device of a driver (e.g., infotainment system 1204 of driver's vehicle) can participate in a one-time transaction over the transaction platform 102 for fuel. The gas station management system 1202 can be executed on one or more devices associated with the gas station, including a desktop computer 1206. The gas station may also include one or more beacons 1208 communicatively coupled to the gas station management system 1202, among other devices that come within communication range of the beacons 1208.

In an example scenario, a driver is driving a vehicle that includes mobile wallet technology (e.g., wallet 1210) set-up in the vehicle's infotainment system 1204. The driver pulls the vehicle up to a gas pump at the gas station to get fuel. Step 1: One of the beacons 1208 positioned at the gas pump signals the vehicle to pair with the gas pump. For example, as part of the signal, the beacon 1208 may provide a link enabling the vehicle's infotainment system 1204 to communicate with the gas station management system 1202 to control the pump and transaction. In one example, the link causes a confirmation prompt to be displayed within a head unit display of the vehicle's infotainment system 1204.

Step 2: The driver confirms, via the prompt, the correct gas pump, where the confirmation is received by the gas station management system 1202. The gas station management system 1202 confirms the wallet 1210 is available for payment. The gas station management system 1202 may authorize the pump session, and the driver may begin to pump fuel into the vehicle.

Step 3: Upon authorization of the pump session, the gas station management system 1202 may transmit a request to establish a first session with the transaction platform 102, where information associated with the confirmed wallet 1210 may be transmitted as part of or along with the request. The transaction platform 102 may establish the first session as well as an integrated session among the transaction platform, the gas station management system 1202, and the wallet 1210 of the infotainment system 1204.

Step 4: When the fueling is complete, the transaction platform 102 receives an invoice for the fuel total and sends a payment request as an API call to the wallet 1210. Step 5: The wallet 1210 may respond to the payment request by returning an API call to the transaction platform 102 authorizing the payment.

Step 6: The transaction platform 102 transmits a communication with the fuel total and wallet 1210 payment information to the payment processing system 205 (e.g., via a gateway that routes the payment information to a correct payment processing system based on the payment method selected). Step 7: The payment processing system 205 then provides a confirmation that the funds are available, and thus the payment is authorized, via a return communication to the transaction platform 102. Step 8: The transaction platform 102 may then send communications regarding the confirmation to one or more of the gas station management system 1202 and the infotainment system 1204 (e.g., for display via the head unit display).

In some examples, the payment may be automatically made by parameter (including a penalty by contract) based on detecting an absence of the vehicle near the gas pump before completion of the transaction or based on a time parameter set on the transaction or other similar logical parameter. This automatic, parameter based payment may assure receipt of payment even in circumstances where a driver may be unscrupulous and drive off without authorizing a payment.

Figure 13:
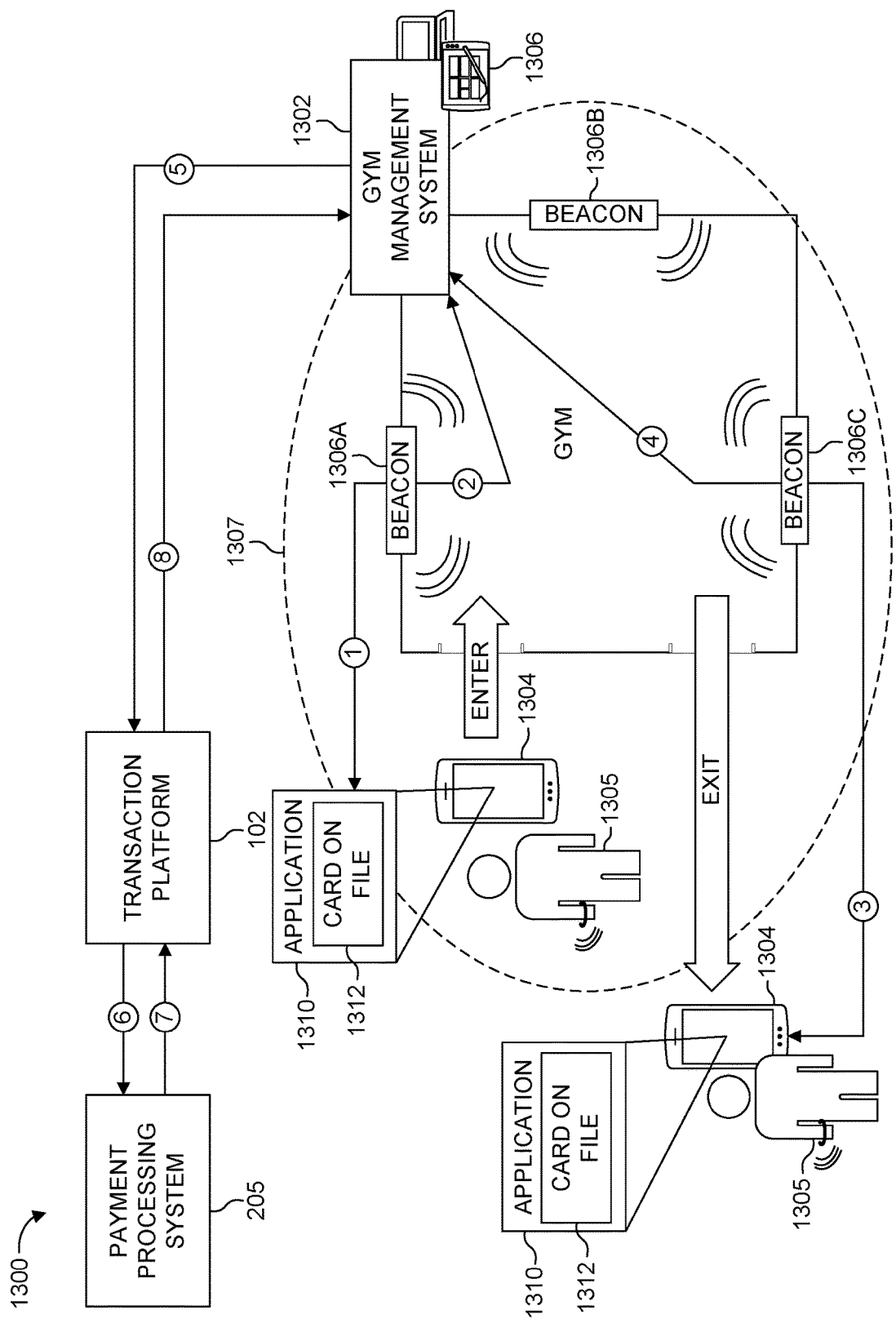
FIG. 13 conceptually illustrates an example use of the ambient transaction system to facilitate a pay-as-you-go service transaction.

FIG. 13 conceptually illustrates an example use of an ambient transaction system 1300 to facilitate a pay-as-you-go service transaction. The ambient transaction system 1300 is similar to the ambient transaction system 200, where a management system of a gym (e.g., gym management system 1302) and a connected device of a gym member (e.g., gym member's smart phone 1304) can participate in a one-time transaction over the transaction platform 102 for usage-based gym payment. In some examples, this type of transaction may be referred to as a post-purchase funding transaction. The gym management system 1302 may be executed on one or more devices 1306, such as laptops, tablets, or desktop computers, through thick or thin applications. One or more beacons 1308A, 1308B, 1308C, collectively beacons 1308, may be communicatively coupled to the gym management system 1302 and other mobile devices, such as the gym member's smart phone 1304, that come within communication range of the beacons 1308. The outer perimeters of the communication range of the beacons 1308 may form a geofence 1307 (e.g., a virtual boundary), where particular responses can be triggered when the other mobile devices, such as the gym member's smart phone 1304, enter and leave an area enclosed by the geofence 1307.

In an example scenario, the gym member enters into a pay-as-you-go contract with the gym. The gym member uses their smart phone 1304 to download the gym's mobile application 1310 on the smart phone 1304 and set up a personal account through the application 1310. Setting up the personal account may also include providing credit or debit card information for card on file settings 1312. The gym member, who has their smart phone 1304 in possession, may then enter the gym for a daily exercise session.

Step 1: As the gym member's smart phone 1304 enters into the area defined by the geofence 1307, one or more of the beacons 1308 (e.g., at least beacon 1308A) may detect and recognize the smart phone 1304 through the application 1310, which identifies the gym member via the personal account that was set up through the application 1310. The detection of the smart phone 1304 may trigger a determination that the gym member has entered the gym and initiated an exercise session. Step 2: The beacon 1308A may transmit a communication to the gym management system 1302 that indicates that the gym member has initiated the exercise session.

Step 3: After completing the exercise session, the gym member with their smart phone 1304 still in possession may exit the gym. Each of the beacons 1308 may begin to lose connection with the smart phone 1304 (e.g., beacon 1308C being the last beacon to lose connection) as the smart phone 1304 exits the gym and eventually the area enclosed by the geofence 1307. The loss of connection may trigger a determination that the gym member has exited the gym and terminated the session. Step 4: The beacon 1308C may transmit a communication to the gym management system 1302 that indicates that the gym member has terminated the exercise session.

Step 5: In response, the gym management system may send a payment request to the transaction platform, where the request may include an amount of the daily gym usage fee and information for the card on file settings 1312 retrieved from the gym member's account. Step 6: The transaction platform 102 transmits a communication with the amount of the daily gym usage fee and information for the card on file settings 1312 to the payment processing system 205 (e.g., via a gateway that routes the payment information to a correct payment processing system based on the payment method selected). Step 7: The payment processing system 205 then provides a confirmation that the funds are available, and thus the payment is authorized, via a return communication to the transaction platform 102. Step 8: The transaction platform 102 may then send a communication regarding the confirmation to the gym management system 1302. In some examples, the gym management system 1302 can then send a similar confirmation or notification through the application 1310 on the gym member's smart phone 1304 that indicates success of the payment and to provide a receipt to the gym member.

In another example, the gym member's smart watch 1305 may be another connected device that may perform similar functions to the gym member's smart phone 1304 described in the above steps. For example, if the gym member leaves their smart phone 1304 in their vehicle, the gym member's smart watch 1305 may instead be the connected device detected and recognized by the one or more of the beacons 1308 as associated with the gym member/personal account.

Figure 14:
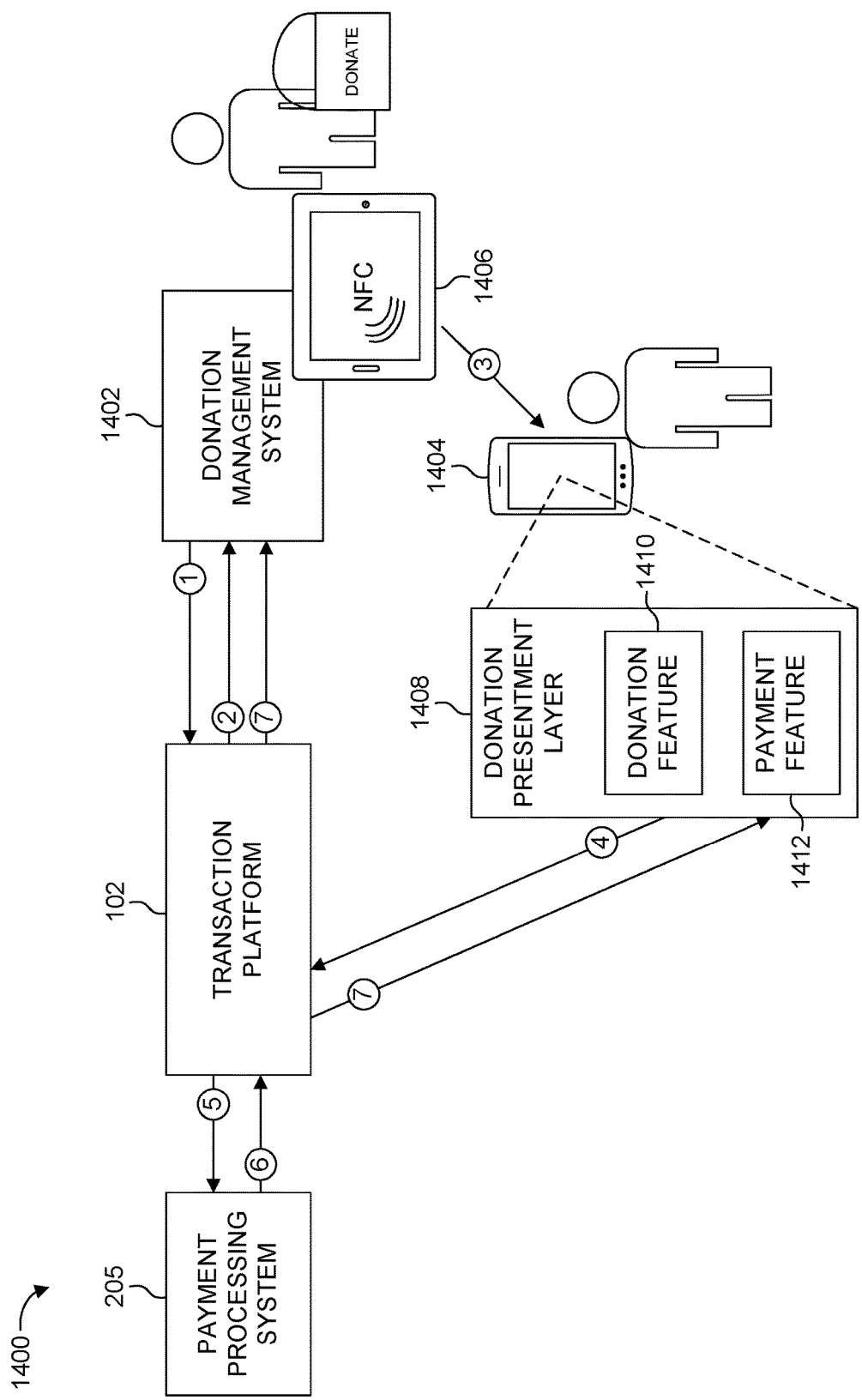
FIG. 14 conceptually illustrates an example use of the ambient transaction system to facilitate a donor transaction.

FIG. 14 conceptually illustrates an example use of an ambient transaction system 1400 to facilitate a donor transaction. The ambient transaction system 1400 may be similar to the ambient transaction system 200, where a management system of a charitable organization (e.g., a donation management system 1402) and a connected device of a donor (e.g., donor's smart phone 1404) can participate in a one-time donation transaction over the transaction platform 102. The donation management system 1402 may be executed on a mobile device, such as tablet 1406, as a thick or thin application. The tablet 1406 and the donor's smart phone 1404 may be NFC enabled.

In an example scenario, to fundraise for certain causes or charitable organization, volunteers may ask for donations at various sites across a community (e.g., at the entrance of businesses, on street corners, in stopped traffic). In addition (or alternatively) to collecting cash, the volunteer may utilize the tablet 1406 to encourage the donor to donate digitally through a link and pay securely on their own device (e.g., the donor's smart phone 1404). In other examples, rather than the tablet 1406, the volunteer may use another type of IoT connected device. For example, physical donation kettles used to collect donations at entrances of businesses during the holiday season may be IoT connected or BLE enabled devices. Similarly, physical boots used by firefighters to collect donations in stopped traffic may be IoT connected or BLE enabled devices.

Step 1: The donation management system 1402 may submit a request to establish a first session with the transaction platform 102 to facilitate donation transactions. Step 2: In order to establish an integrated session among the transaction platform 102, the donation management system 1402, and the donor's smart phone 1404, the transaction platform 102 may generate a presentment layer to facilitate the donation transactions that may be displayed via a hosted payments page on a device, such as the donor's smart phone 1404. The presentment layer may be specific to the type of transaction (e.g., a donation presentment layer 1408). The transaction platform 102 may provide the generated donation presentment layer by use of a link to the hosted payment page within a communication to the donation management system 1402.

Step 3: When the donor approaches the volunteer, the volunteer may encourage the donor to bring their smart phone 1404 close to or wave it across the tablet 1406 to donate through the link. In another example, the IoT connected or BLE enabled donation kettle or firefighter's boot discussed above may provide the link. In further example, a QR code printed on a poster may be presented for the donor to scan with their smart phone 1404. Returning to the original example where the donor is encouraged to bring their smart phone 1404 close to or wave it across the tablet 1406, when the donor does so, and the donor's smart phone 1404 is positioned within a particular distance of the tablet 1406, transmission of an NFC communication may be enabled from the donation management system 1402 to the donor's smart phone 1404 that includes the link. Receipt of the NFC communication by the donor's smart phone 1404 causes the hosted payments page to automatically launch through a web application user interface (e.g., a web browser) installed on the smart phone 1404 and display the donation presentment layer 1408. The donation presentment layer 1408 may include a donation feature 1410 that allows the donor to select a type, an amount, and an optional dedication of a donation, for example, and a payment feature 1412 that provides a variety of mobile payment method options via the donor's smart phone 1404.

Step 4: Upon entering donation information via the donation feature 1410, the donor can then utilize the payment method options provided through the payment feature 1412 to select a method with which to pay the amount of the donation. Selection of a payment method via the payment feature 1412 causes transmission of a communication from the donor's smart phone 1404 to the transaction platform 102 that indicates the payment amount and information associated with the payment method.

Step 5: The transaction platform 102 transmits a communication with the payment information to the payment processing system 205 (e.g., via a gateway that routes the payment information to a correct payment processing system based on the payment method selected). Step 6: The payment processing system 205 then provides a confirmation that the funds are available, and thus the payment is authorized, via a return communication to the transaction platform 102. Step 7: The transaction platform 102 may then send communications regarding the confirmation to one or more of the donation management system 1402 and the donor's smart phone 1404. The transaction platform 102 may close at least the integrated session. The transaction platform 102 may also close the first session.

Figure 15:
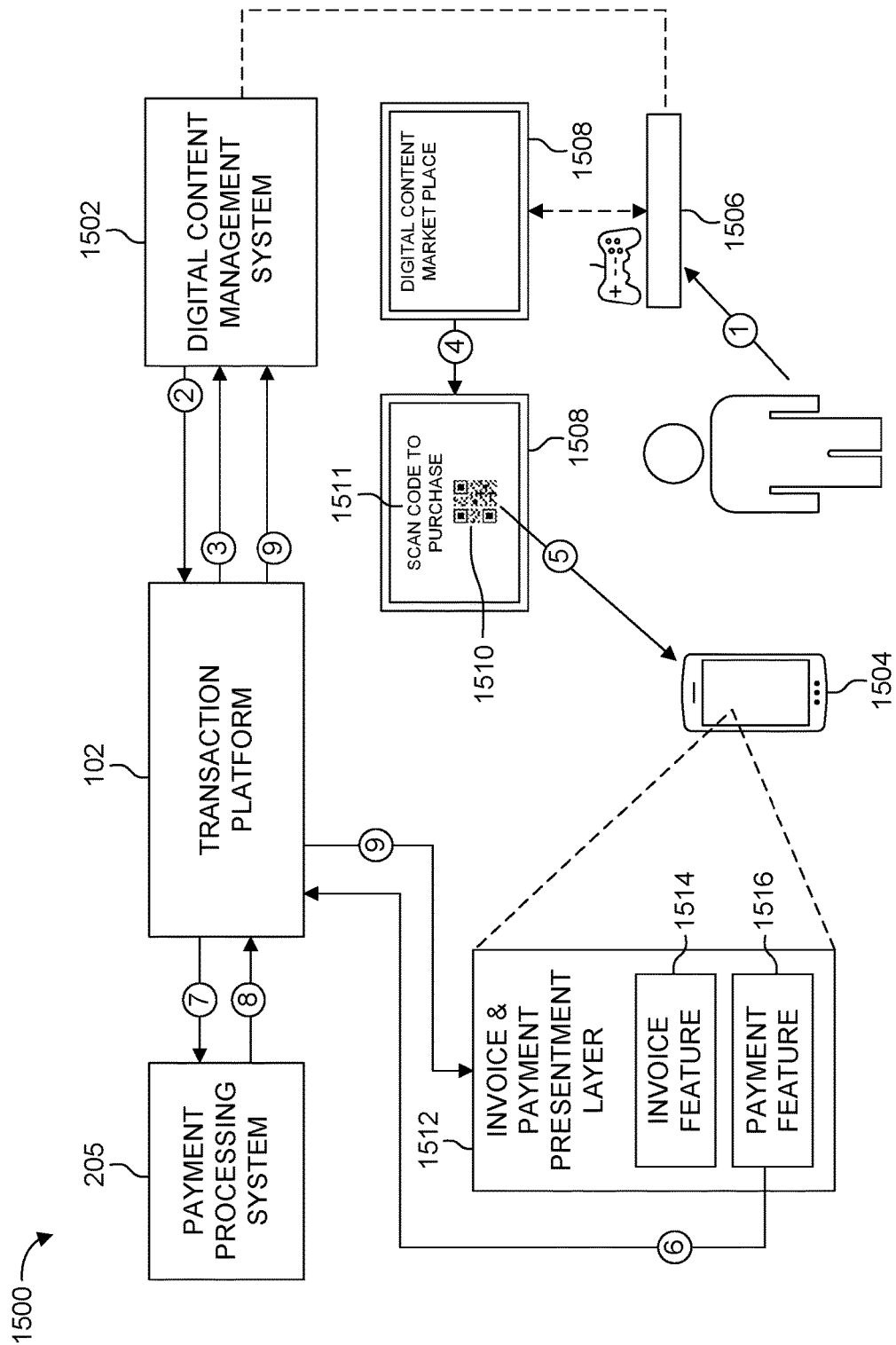
FIG. 15 conceptually illustrates an example use of the ambient transaction system to facilitate a digital content transaction in a gaming environment.

FIG. 15 conceptually illustrates an example use of an ambient transaction system 1500 to facilitate a digital content transaction in a gaming environment. The ambient transaction system 1500 may be similar to the ambient transaction system 200, where a digital content management system 1502 and a connected device of a gamer (e.g., gamer's smart phone 1504) can participate in a one-time transaction over the transaction platform 102 for a digital content transaction. The digital content management system 1502 may be executed on a gaming console 1506 through a thick or thin application, where the gaming console 1506 may be communicatively coupled (wired or wirelessly) to a display device 1508, such as a television or a monitor or a virtual reality headset, among other examples.

In an example scenario, the gamer interacts with the gaming console 1506 to search for a game within a digital content market place hosted by the digital content management system 1502. Step 1: When the gamer selects digital content from the digital market place to purchase via the gaming console 1506, the digital content management system 1502 transmits a request to establish a first session with the transaction platform 102, where information associated with the selected digital content as well as an invoice owed for the digital content may be provided to the transaction platform 102 for use in generating a presentment layer that is specific to the one-time transaction between the digital content management system 1502 and the gamer's smart phone 1504 (e.g., an invoice and payment presentment layer 1512). In order to establish an integrated session among the transaction platform 102, the digital content management system 1502 and the gamer's smart phone 1504, the transaction platform 102 may generate a machine readable code, such as a QR code 1510, that when scanned by a device, such as the gamer's smart phone 1504, causes the invoice and payment presentment layer 1512 to be displayed on the device via a hosted payments page. In another example, rather than a QR code, an image or bitmap related to or representative of the digital content may generated. For example, if the digital content selected by the gamer is associated with magical beings, such as warlocks, then the image or bitmap may represent a crystal ball and a related prompt may accompany the image (e.g., scan the Warlock's crystal ball to make payment).

Step 3: The transaction platform 102 may send the QR code 1510 (or the image or bitmap) within a communication to the digital content management system 1502. Step 4: Upon receipt, the digital content management system 1502 may cause display of the QR code 1510 on the display device 1508. In some examples, a prompt 1511 may be displayed along with the QR code 1510 to prompt the gamer to scan the QR code 1510 to purchase the digital content. Step 5: The gamer's smart phone 1504 may scan the QR code 1510 being displayed on the display device 1508 (e.g., via a code scanning application executing on the gamer's smart phone 1504). Scanning the QR code 1510 causes display of the invoice and payment presentment layer 1512 via a hosted payments page on the gamer's smart phone 1104. The hosted payments page may be displayed within a web application user interface (e.g., via a web browser) on the gamer's smart phone 1104. The invoice and payment presentment layer 1512 may include an invoice feature 1514 through which the invoice for the digital content may be viewed and a payment feature 1516 providing a variety of mobile payment method options via the gamer's smart phone 1504.

Step 6: The gamer can then utilize the payment method checkout options provided through the payment feature 1516 of the invoice and payment presentment layer 1512 displayed via the hosted payments page on the gamer's smart phone 1504 to pay the invoice. Selection of a payment method via the payment feature 1516 causes transmission of a communication from the gamer's smart phone 1504 to the transaction platform 102 that indicates the payment method and associated information. As one example, the gamer selects a payment application installed on the gamer's smart phone 1504.

Step 7: The transaction platform 102 transmits a communication with the payment information to the payment processing system 205 (e.g., via a gateway that routes the payment information to a correct payment processing system based on the payment method selected). Step 8: The payment processing system 205 then provides a confirmation that the funds are available, and thus the payment is authorized, via a return communication to the transaction platform 102. Step 9: The transaction platform 102 may then send communications regarding the confirmation to one or more of the digital content management system 1502 and the gamer's smart phone 1504. The transaction platform 102 may close at least the integrated session. The transaction platform 102 may also close the first session.

In the example described above, the gamer's smart phone 1504 is described as the connected device that participates in digital content transaction. In other examples, the gaming console 1506 itself may be the connected device, where the digital content transaction occurs via a virtual checkout environment within the game that is running on the gaming console 1506.

Figure 16:
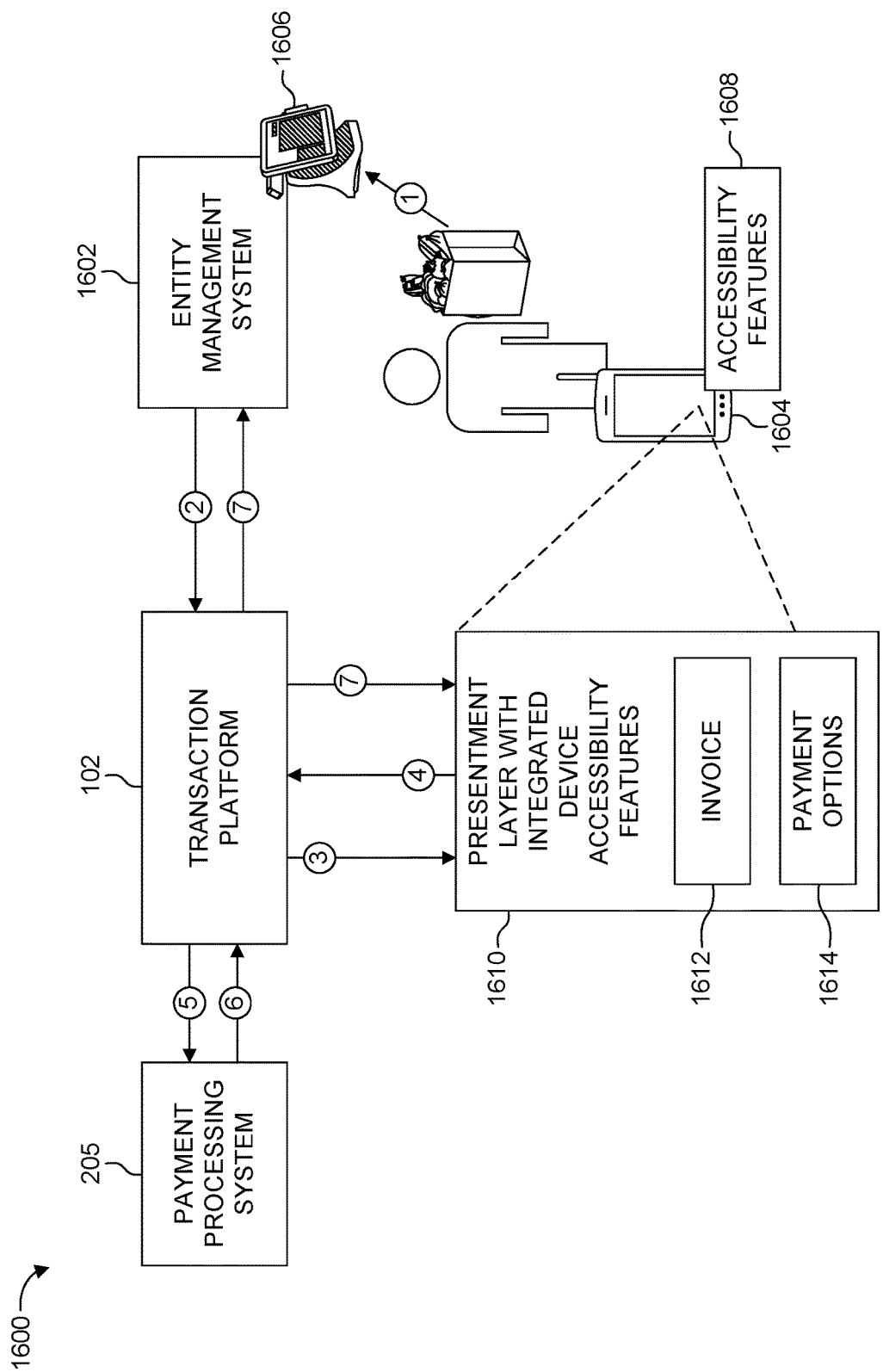
FIG. 16 conceptually illustrates an example use of the ambient transaction system that leverages accessibility features of a connected device.

FIG. 16 conceptually illustrates an example use of an ambient transaction system 1600 that leverages accessibility features of a connected device. The ambient transaction system 1600 is similar to the ambient transaction system 200, where a management system of any entity type involved in transactions (e.g., entity management system 1602) and a connected device of a disabled user (e.g., smart phone 1604) can participate in a payment transaction over the transaction platform 102. As illustrated herein, the entity may be a merchant grocery store. In some examples, the entity management system 1602 may be executed on a computing device 1606 utilized as a checkout register or payment terminal. The smart phone 1604 may include one or more accessibility features 1608 that aid the disabled user. As one example, for a color-blind or visually impaired user, accessibility features 1608, such as large font, color filters, etc., may be activated on the smart phone 1604 to aid the disabled user. In another example, the transaction may be voice enabled.

Traditional interfaces and positioning of payment terminals (e.g., card readers or PIN Pads) on a merchant's countertop or checkout lane may create challenges and even harmful situations for disabled persons. The ambient transaction system 1600 removes these potential challenges and harms by placing the ability to transact into the disabled person's hands, using devices (e.g., the smart phone 1604) with which they are comfortable. Take, for example, a color-blind or visually impaired individual who utilizes the accessibility features 1608 (i.e. large font, color filters, etc.) of their smart phone 1604. Such accessibility features typically do not exist at checkout registers or on payment terminals, impeding the ability of these users to comfortably and confidently transact. Using the ambient transaction system 1600, the user is no longer required to interact with the user-unfriendly interfaces and positioning of payment terminals. Instead, at Step 1: the entity management system 1602 is used to ring up (e.g., input) the user's grocery item purchases to determine a final total owed by the disabled user. In some examples, a mobile number of the smart phone 1604 is also obtained and input to entity management system 1602. Step 2: The entity management system 1602 may transmit a request to the transaction platform 102 to establish a first session with the entity management system 1602 along with the mobile number of the smart phone 1604. The transaction platform 102 establishes the first session with the entity management system 1602, as well as an integrated session among the transaction platform 102, the entity management system 1602, and the smart phone 1604 using the mobile number. Alternatively, other methods can be used to establish the integrated session, including other methods described in the example scenarios presented in FIGS. 8-15.

Step 3: The transaction platform 102 may provide a presentment layer to the disabled user's smart phone 1604 via the integrated session that is associated with the transaction, where the presentment layer can be presented with the accessibility features 1608 of the disabled user's smart phone 1604 integrated (e.g., a presentment layer with integrated device accessibility features 1610). The presentment layer with integrated device accessibility features 1610 may be displayed via a hosted payments page, and include at least an invoice feature 1612 through which the invoice for the grocery items purchases may be viewed and a payment feature 1614 providing a variety of mobile checkout options via the disabled user's smart phone 1104. The integrated accessibility features 1608 provide the user with large font and/or color filters, among other examples, that facilitate the user's viewing or hearing of the invoice and checkout options.

Step 4: The disabled user can then utilize the payment method checkout options provided through the payment feature 1614 of the presentment layer with integrated device accessibility features 1610 to pay the invoice. Selection of a payment method via the payment feature 1614 causes transmission of a communication from the smart phone 1604 to the transaction platform 102 that indicates the payment method and associated information. As one example, the user selects a mobile wallet loaded on the smart phone 1604.

Step 5: The transaction platform 102 transmits a communication with the payment information to the payment processing system 205 (e.g., via a gateway that routes the payment information to a correct payment processing system based on the payment method selected). Step 6: The payment processing system 205 then provides a confirmation that the funds are available, and thus the payment is authorized, via a return communication to the transaction platform 102. Step 7: The transaction platform 102 may then send communications regarding the confirmation to one or more of the entity management system 1602 and the smart phone 1604. The transaction platform 102 may close at least the integrated session. The transaction platform 102 may also close the first session.

The examples provided in FIGS. 8-16 are non-limiting and non-exhaustive scenarios for implementation of various embodiments of the ambient transaction system disclosed herein. Further examples include, but are not limited to: quick service restaurants (QSRs), drive-through restaurants, food trucks, retail merchants, pop-up stores, mail-order/telephone-order (MOTO), one-time or reoccurring electronic commerce (eCommerce) and mobile commerce (mCommerce) payments, billpay and billers (e.g., insurance, telecommunications, media, rental, utilities, etc.), peer-to-peer (P2P) and social media payments, home or field services payments (e.g., yardwork, plumbing, handyman, roadside assistance, etc.), venue sales (e.g., stadiums, concert venues, expositions, tradeshows, etc.), outdoor sales (e.g., festivals, fairs, farmers' markets), unattended retail or outdoor sales (e.g., vending machines, kiosks, billboards, bus-stop signage, etc.), shared economy merchants (e.g., ride share merchants, home rental sites, and freelance sites), charities (e.g., online crowdfunding sites, charity auctions, silent auctions, and donation points), garage and/or yard sales and online digital marketplaces, transactions between an application and one or more other applications in a software environment, virtual environments (e.g., digital games and augmented reality and virtual reality (AR/VR) experiences), barter if enabled with a barter or time-bank digital market, and non-business consumers making and accepting payments.

Additionally, the embodiments described herein with reference to FIGS. 1-16 include scenarios where a payee of the transaction (or party that is receiving some sort of data structured object in the transaction) is initiating the establishment of the integration session between the management system of the payee, the connected device of the payor, and the transaction platform, and the connected device of the payor is receiving the presentment layer (e.g., receiving the link to cause display of the presentment layer). However, in other embodiments, the payor of the transaction (or party that is transferring some sort of data structured object in the transaction) may initiate the establishment of the integration session between the connected device of the payor, the management system of the payee, and the transaction platform. In these other embodiments, the presentment layer may not explicitly be provided to the payor, but instead a payment may be automatically pushed to the payee or the management system of the payee. For example, the payor may be directly charged via the connected device of the payor and a payment confirmation (e.g., a receipt, bill of sale, etc.) may be generated by the management system of the payee for provision to the payor.

To provide an example scenario, a digital branding manager needs an office space for the day and leaves their apartment to use a temporary office in a shared workspace environment. The shared workspace may be a pre-book and pay-as-you-use environment that allows a user maximum flexibility in service. For example, the user may be charged a rate of $20/hour of use of the temporary office, and all office equipment (e.g., printers, copiers, WiFi, and other features) as well as refreshments (e.g., coffee, snacks, etc.) are paid as the individual uses them in real time. In some examples, the user may initially register with a management system of the shared workspace environment (e.g., as part of the pre-booking process).

The digital brand manager may select and enter a temporary office of the shared workspace environment for the workday. In some examples, a connected device of the digital brand manager (e.g., a mobile phone) may perform an NFC tap with an in-room screen or other similar device display in the office to activate a session. Additionally or alternatively, a geofence in the office recognizes and pairs the digital brand manager's mobile phone to the office. In further examples, the mobile phone may interact with another office device via one or more different types of links to activate the session. Thus, an integrated session may now be established between the connected device, the management system of the shared workspace environment, and the transaction platform. After a couple hours of working and taking calls, the digital brand manager steps out of the office to get refreshments and scan some documents to a client. Smart cameras installed in the shared workspace environment capture the digital brand manager as they get a cup of coffee, a cheese Danish, and uses the copier to scan some documents. The digital brand manager continues to work in the office for another couple hours until meetings are over and exits the shared workspace environment to return home and complete the remainder of the workday there.

Rather than sending a request for payment, all of the pay-as-you-go charges have been compiled within the integrated session along with the hourly rate charges and payment is automatically and directly sent via a wallet, for example, on the digital branding manager's mobile phone through the transaction platform and to the management system of the shared workspace environment. The digital branding manager may then receive a payment confirmation, such as an e-mail with a receipt of charges later that afternoon. Resultantly, the user is enabled to operate freely without having to constantly receive payment confirmations throughout the day, as payments are automatically completed securely and in real-time as the services are used.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting The above specification, examples and data provide a complete description of the use of the invention. Since many embodiments of the invention can be made without departing from the spirit and scope of the invention, the invention resides in the claims hereinafter appended.

The invention claimed is:

1. A method comprising:
    in response to a management system associated with a first party to a transaction detecting a second party is transacting with the management system, receiving, at a transaction platform from the management system, a request to establish a first session with the management system;
    in response to receiving the request, establishing the first session between the transaction platform and the management system to enable transfer of data, the data including integration logic of the management system;
    identifying a connected device of the second party to the transaction;
    establishing an integrated session among the transaction platform, the management system, and the connected device;
    subsequent to establishing the integrated session, providing, by the transaction platform to the connected device via the integrated session, a presentment layer associated with the transaction, the presentment layer including a plurality of features of the management system associated with the transaction, the plurality of features obtained from the integration logic of the management system; and
    upon completion of the transaction, closing one or more of the first session and the integrated session.

2. The method of claim 1, wherein providing the presentment layer includes providing, by the transaction platform to the connected device via the integrated session, a link to the presentment layer.

3. The method of claim 2,
    wherein the presentment layer provided by the transaction platform to the connected device as a link is one of automatically displayed through a user interface of the connected device upon the receipt of the link at the connected device or is displayed through the user interface in response to a selection or a reading of the link.

4. The method of claim 2, wherein the link is one or more of an instruction or an address that passes control and parameters, including parameters associated with the management system, to the connected device.

5. The method of claim 2, wherein the providing the link includes one or more of:
providing, as the link, a hyperlink in an electronic communication that is transmitted to the connected device using an identifier of the connected device received as part of the request, the electronic communication including one or more of an electronic mail message, a text message, and an application message;
generating, as the link, one of a machine readable code, sound, image or bitmap for provision to the management system for audio or visual output to the connected device, wherein the outputted machine readable code, sound, image or bitmap is read by the connected device, and
providing, as the link, a wireless communication from a device executing the management system to the connected device.

6. The method of claim 1, wherein the plurality of features include at least an invoice feature displaying a current state of an invoice associated with the transaction and a payment feature providing a plurality of selectable payment options to pay the invoice.

7. The method of claim 6, further comprising:
receiving, from the connected device via the integrated session, a selection of a payment option from the plurality of selectable payment options to pay the invoice and complete the transaction;
providing an amount of the invoice and information associated with the selected payment option to a payment processor via a payment gateway to authorize payment;
receiving a confirmation of the payment authorization from the payment processor via the payment gateway; and
providing the confirmation of the payment authorization to one or more of the management system and the connected device.

8. The method of claim 1, wherein:
the plurality of features of the management system included in the presentment layer are specific to a transaction type of the transaction;
the transaction type includes one or more of: a transfer of a structured data object, a sale of an item or a service, a donation, an order of an item or a service, a pre-order of an item or a service, a return of an item, post-purchase funding, a provision of a reward, and a provision of a discount; and
the transaction type is one of a one-time transaction, an ongoing transaction, and a recurring transaction.

9. The method of claim 8, wherein the transaction type is an ongoing transaction associated with a sale of one or more items, and the plurality of features include one or more of:
a feature to view a plurality of items available for sale and information associated with the plurality of items,
a feature to add one or more of the plurality of items to the transaction,
a feature to request assistance,
a feature to view a current state of an invoice associated with the transaction at one or more of an end of the transaction and upon each addition of an item from the plurality of items to the transaction, and
a feature to pay the invoice, wherein the feature to pay the invoice includes one or more sub-features including sub-features to input one or more of a tip, a rating, and a dispute, and sub-features to present loyalty offers or points.

10. The method of claim 1, further comprising:
receiving, at the transaction platform from the connected device, a message associated with the transaction.

11. The method of claim 10, wherein at least one of the plurality of features is a payment feature, and the message is received from the connected device in response to the connected device receiving input associated with the payment feature through a user interface of the connected device.

12. The method of claim 1, wherein the presentment layer provided by the transaction platform to the connected device enables integration of one or more accessibility features of the connected device within the presentment layer displayed through a user interface of the connected device.

13. The method of claim 1, wherein identifying the connected device of the second party to the transaction includes one of:
identifying the connected device based on an identifier of the connected device included in the request; or
generating a link and transmitting the link to the management system for provision to the connected device, wherein the link is one of:
a machine readable code, sound, image or bitmap transmitted to the management system for audible or visual output to the connected device, wherein the connected device is identified in response to the connected device reading the outputted machine readable code, sound, image or bitmap; or
a wireless communication transmitted to the management system for further transmission to the connected device, wherein the connected device is identified in response to the connected device receiving the wireless communication.

14. The method of claim 1, wherein the integrated session is authenticated to generate a unique, tokenized session among the transaction platform, the management system, and the connected device.

15. The method of claim 1, further comprising:
receiving, at the transaction platform from the connected device via the integrated session, a selection of a payment option from a plurality of selectable payment options provided to enable payment via a payment feature of the plurality of features included in the presentment layer;
providing, by the transaction platform, an amount of the payment and information associated with the selected payment option to a payment processor via a payment gateway to authorize payment, wherein the management system is not provided with the information associated with the selected payment option;
receiving, at the transaction platform, a confirmation of the payment authorization from the payment processor via the payment gateway; and
providing, by the transaction platform, the confirmation of the payment authorization to one or more of the management system and the connected device.

16. A method, comprising:
detecting, by a management system associated with a first party to a transaction, that a second party is transacting with the management system;

in response to the detection, transmitting, by the management system to a transaction platform, a request to establish a first session with the transaction platform;

subsequent to the establishing of the first session between the transaction platform and the management system, transferring data, by the management system to the transaction platform via the first session, the data including integration logic of the management system;

subsequent to the establishing of (1) the first session between the transaction platform and the management system and (2) an integrated session among the transaction platform, the management system, and a connected device identified as being associated with the second party, causing the transaction to be recorded within the integrated session;

transmitting, by the management system to the transaction platform, corresponding data to populate a plurality of features associated with the transaction that are obtained from the integration logic for provision within a presentment layer to the connected device via the integrated session; and upon completion of the transaction, ending the recording of the transaction.

17. The method of claim 16, wherein detecting that the second party is transacting with the management system comprises one of:

a presence of one of the connected device or a user associated with the connected device using one or more of geolocation detection, camera detection, sound detection, or biometric detection; or receiving an initiation of the transaction.

18. The method of claim 17, wherein an identifier of the connected device is received as input as part of the initiation and used by the transaction platform to identify the connected device and establish the integrated session.

19. The method of claim 16, the method further comprising:

receiving, from the transaction platform, a link to provide to the connected device, wherein the link is one of:

a machine readable code, sound, image or bitmap received from the transaction platform to be audibly or visually output, wherein the connected device is identified, the integrated session is established, and the presentment layer is automatically displayed on the connected device in response to the connected device reading the outputted machine readable code, sound, image or bitmap; and a wireless communication received from the transaction platform to be transmitted to the connected device, wherein the connected device is identified, the integrated session is established and the presentment layer is automatically displayed on the connected device in response to receipt of the wireless communication at the connected device.

20. The method of claim 16, further comprising:

receiving a confirmation, from the transaction platform, that a payment to complete the transaction provided via the connected device has been authorized; and ending the recording of the transaction upon receiving the confirmation.

* * * * *

UNITED STATES PATENT AND TRADEMARK OFFICE
CERTIFICATE OF CORRECTION

| | | |
|---|---|---|
| PATENT NO. | : 11,195,215 B1 | Page 1 of 1 |
| APPLICATION NO. | : 17/115070 | |
| DATED | : December 7, 2021 | |
| INVENTOR(S) | : Jeremy M. Silver | |

It is certified that error appears in the above-identified patent and that said Letters Patent is hereby corrected as shown below:

In the Specification

Column 6
Line 30, "transaction," should read --transaction.--.

Column 17
Line 40, "110)" should read --110).--.
Line 53-54, "(Activematrix" should read --Active Matrix--.
Line 59, "1718" should read --1718.--.

Column 32
Line 25, "limiting" should read --limiting.--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*